US012636882B2

(12) United States Patent
Maeda

(10) Patent No.: US 12,636,882 B2
(45) Date of Patent: May 26, 2026

(54) HEAD, METHOD OF DRIVING HEAD, AND MEDIUM

(71) Applicant: BROTHER KOGYO KABUSHIKI KAISHA, Nagoya (JP)

(72) Inventor: Atsushi Maeda, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 154 days.

(21) Appl. No.: 18/595,954

(22) Filed: Mar. 5, 2024

(65) Prior Publication Data

US 2024/0308211 A1 Sep. 19, 2024

(30) Foreign Application Priority Data

Mar. 16, 2023 (JP) ................................ 2023-042150

(51) Int. Cl.
*B41J 2/045* (2006.01)

(52) U.S. Cl.
CPC ....... *B41J 2/04588* (2013.01); *B41J 2/04541* (2013.01); *B41J 2/04546* (2013.01); *B41J 2/04581* (2013.01)

(58) Field of Classification Search
CPC .................................................... B41J 2/04588
See application file for complete search history.

(56) References Cited

U.S. PATENT DOCUMENTS

2005/0128233 A1* 6/2005 Barkley ............... B41J 2/04541 347/11
2014/0055513 A1* 2/2014 Usui .................... B41J 2/04595 347/11
2022/0314615 A1* 10/2022 Maeda ................. B41J 2/04588
2022/0314617 A1* 10/2022 Hiwada ................ B41J 2/04581
2023/0083297 A1* 3/2023 Maeda ................. B41J 2/04573 347/10
2023/0094405 A1* 3/2023 Shimamura .......... B41J 2/04546 368/29
2023/0382110 A1* 11/2023 Maeda ................. B41J 2/04588

FOREIGN PATENT DOCUMENTS

JP 2022-155438 A 10/2022

* cited by examiner

*Primary Examiner* — Shelby L Fidler
(74) *Attorney, Agent, or Firm* — Kenealy Vaidya LLP

(57) ABSTRACT

There is provided a head including: a nozzle plate having a nozzle; a signal generator configured to generate, based on first and second data representing first and second driving waveforms, time division multiplex signal including first and second portions of the first driving waveform, third and fourth portions of the second driving waveform; and separator configured to separate first or second driving waveform signal representing the first or second driving waveform from the time division multiplex signal by performing a sampling. The separator is configured to perform the sampling with a sampling frequency less than a resonance frequency at the nozzle. The energy generating element is configured to be driven by the first or second driving waveform signal separated by the separator.

14 Claims, 13 Drawing Sheets

HEAD, METHOD OF DRIVING HEAD, AND MEDIUM

REFERENCE TO RELATED APPLICATIONS

This application claims priority from Japanese Patent Application No. 2023-042150 filed on Mar. 16, 2023. The entire content of the priority application is incorporated herein by reference.

BACKGROUND ART

There is proposed a printing apparatus configured to generate a time division multiplex signal from a plurality of driving waveform signals of which waveforms are mutually different, and to separate any one of the plurality of driving waveform signals from the time division multiplex signal. Each of the plurality of driving waveform signals corresponds, for example, to a size of a liquid droplet to be discharged. By applying any one of the plurality of driving waveform signals to each of nozzles, a liquid droplet of a desired size is discharged (ejected) from each of the nozzles.

SUMMARY

The printing apparatus described in Japanese Patent Application Laid-open No. 2022-155438 performs sampling of the time division multiplex signal with a predetermined sampling frequency and separates the driving waveform signal. In a case that the sampling frequency is higher than a frequency required for separating the driving waveform signal, this might lead to any unnecessary increase in the power consumption.

The present disclosure has been made in view of the above-described situation. An object of the present disclosure is to provide a head, a method of driving a head, and medium each of which is capable of suppressing unnecessary increase in the sampling frequency.

According to an aspect of the present disclosure, there is provided a head including:

a nozzle plate having a nozzle configured to discharge a liquid by an energy generating element;

a signal generator configured to generate, based on at least first data representing a first driving waveform and second data representing a second driving waveform different from the first driving waveform, a time division multiplex signal including a first portion being a part of the first driving waveform, a second portion being other part of the first driving waveform, a third portion being a part of the second driving waveform and a fourth portion being other part of the second driving waveform; and a separator configured to separate a first driving waveform signal representing the first driving waveform or a second driving waveform signal representing the second driving waveform from the time division multiplex signal generated by the signal generator, by performing a sampling of the time division multiplex signal, wherein:

in the time division multiplex signal, the third portion being the part of the second driving waveform is aligned between the first portion being the part of the first driving waveform and the second portion being other part of the first driving waveform, and the second portion being other part of the first driving waveform is aligned between the third portion being the part of the second driving waveform and the fourth portion being other part of the second driving waveform;

the time division multiplex signal is configured to transmit the first data and the second data via a single signal line;

the separator is configured to perform the sampling of the time division multiplex signal with a sampling frequency less than a resonance frequency at the nozzle; and the energy generating element is configured to be driven by the first driving waveform signal or the second driving waveform signal separated by the separator.

According to an aspect of the present disclosure, there is provided a method of driving a head, the head including a nozzle plate having a nozzle configured to discharge a liquid by an energy generating element, the method including:

generating, based on at least first data representing a first driving waveform and second data representing a second driving waveform different from the first driving waveform, a time division multiplex signal including a first portion being a part of the first driving waveform, a second portion being other part of the first driving waveform, a third portion being a part of the second driving waveform and a fourth portion being other part of the second driving waveform; and separating a first driving waveform signal representing the first driving waveform or a second driving waveform signal representing the second driving waveform from the time division multiplex signal, wherein:

in the time division multiplex signal, the third portion being the part of the second driving waveform is aligned between the first portion being the part of the first driving waveform and the second portion being other part of the first driving waveform, and the second portion being other part of the first driving waveform is aligned between the third portion being the part of the second driving waveform and the fourth portion being other part of the second driving waveform;

the time division multiplex signal is configured to transmit the first data and the second data via a single signal line; and the separating of the first driving waveform signal or the second driving waveform signal is performed with a sampling frequency less than a resonance frequency at the nozzle, the method further comprising driving the energy generating element by the first driving waveform signal or the second driving waveform signal.

According to an aspect of the present disclosure, there is provided a non-transitory computer-readable medium storing a program that is executable by a controller configured to control a head, the head including a nozzle plate having a nozzle configured to discharge a liquid by an energy generating element;

the program is configured to cause the controller to execute processes of:

generating, based on at least first data representing a first driving waveform and second data representing a second driving waveform different from the first driving waveform, a time division multiplex signal including a first portion being a part of the first driving waveform, a second portion being other part of the first driving waveform, a third portion being a part of the second driving waveform and a fourth portion being other part of the second driving waveform; and separating a first driving waveform signal representing the first driving waveform or a second driving waveform signal representing the second driving waveform from the time division multiplex signal, wherein:

in the time division multiplex signal, the third portion being the part of the second driving waveform is aligned between the first portion being the part of the first driving waveform and the second portion being other part of the first driving waveform, and the second portion being other part of the first driving waveform is aligned between the third portion being the part of the second driving waveform and the fourth portion being other part of the second driving waveform;

the time division multiplex signal is configured to transmit the first data and the second data via a single signal line; and the separating of the first driving waveform signal or the second driving waveform signal is performed with a sampling frequency less than a resonance frequency at the nozzle, the program is further configured to cause the controller to execute a process of driving the energy generating element by the first driving waveform signal or the second driving waveform signal.

In a head, a method of driving a head, and a medium according to an aspect of the present disclosure, a driving waveform signal is separated from a time division multiplex signal by performing a sampling of the time division multiplex signal with a sampling frequency less than a resonance frequency at a channel, and thus it is possible to suppress any unnecessary increase in the sampling frequency.

DESCRIPTION

First Embodiment

Figure 1:
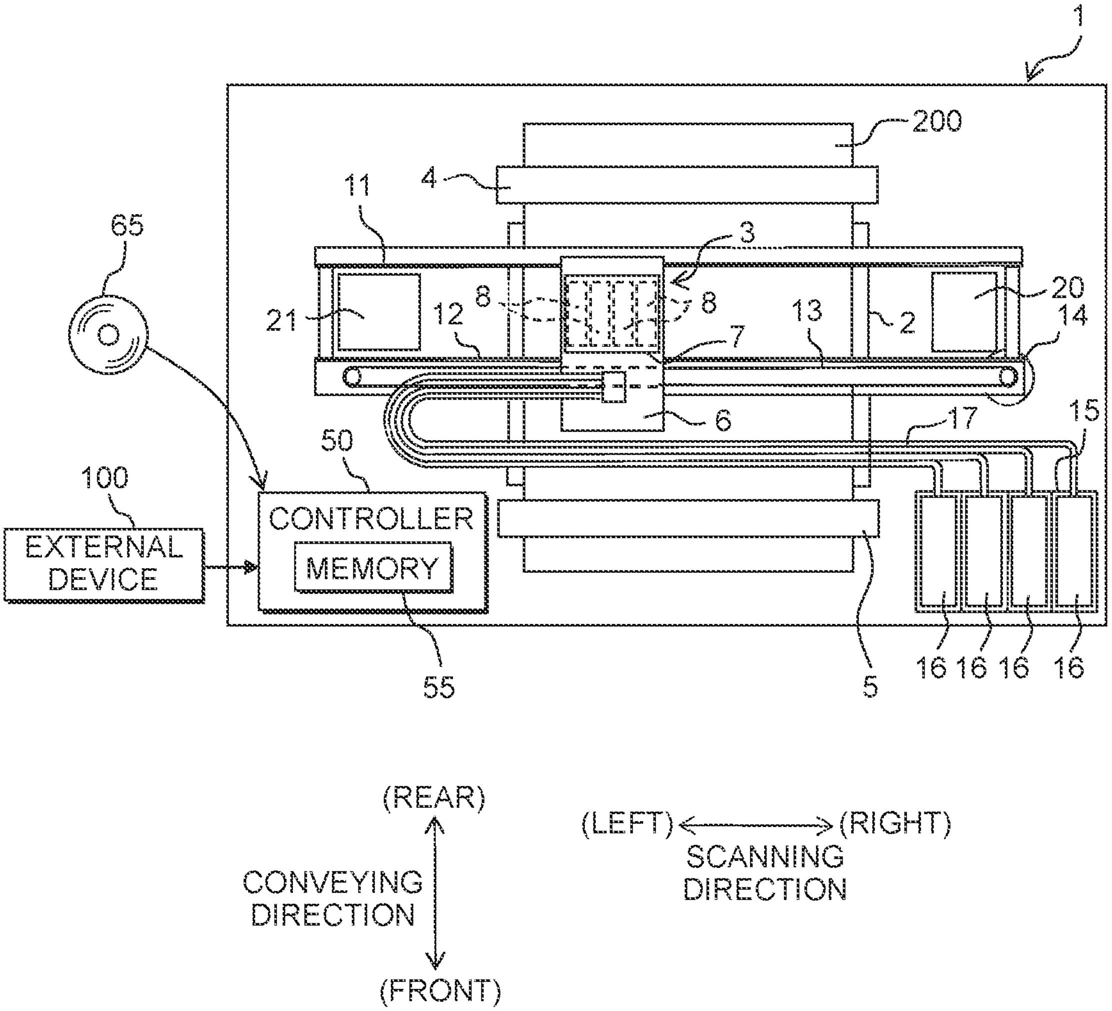
FIG. 1 is a plan view schematically depicting a printing apparatus according to a first embodiment.

The present disclosure will be explained below on the basis of the drawings depicting a printing apparatus according to a first embodiment. FIG. 1 is a plan view schematically illustrative of a printing apparatus 1. In the following explanation, the front, rear, left, and right depicted in FIG. 1 are used. The front-rear direction corresponds to a conveying direction, and the left-right direction corresponds to a scanning direction. The surface side of FIG. 1 corresponds to the upper side, and the underside corresponds to the lower side. In the following explanation, the up-down direction is also used.

As depicted in FIG. 1, the printing apparatus 1 is provided with, for example, a platen 2, an ink discharge device 3, and conveying rollers 4, 5. A recording paper 200, which is a recording medium, is placed on the upper surface of the platen 2. The ink discharge device 3 records an image by discharging ink(s) to the recording paper 200 placed on the platen 2. The ink discharge device 3 is provided with, for example, a carriage 6, a subtank 7, four ink-jet heads 8, and a circulating pump (not depicted).

Two guide rails 11, 12, which guide the carriage 6 and which extend in the left-right direction, are provided above the platen 2. An endless belt 13, which extends in the left-right direction, is connected to the carriage 6. The endless belt 13 is driven by a carriage driving motor 14. The carriage 6 is reciprocatively moved in the scanning direction in an area opposed to the platen 2 while being guided by the guide rails 11, 12 in accordance with the driving of the endless belt 13. More specifically, the carriage 6 performs a first movement in which the four ink-jet heads 8 are moved from a first position to a second position from the left to the right in the scanning direction, and a second movement in which the four ink-jet heads 8 are moved from the second position to the first position from the right to the left in the scanning direction, in a state in which the carriage 6 supports the four ink-jet heads 8.

A cap 20 and a flashing receiver 21 are provided between the guide rails 11, 12. The cap 20 and the flashing receiver 21 are arranged below the ink discharge device 3. The cap 20 is arranged at right end portions of the guide rails 11, 12, and the flashing receiver 21 is arranged at left end portions of the guide rails 11, 12. Note that the cap 20 and the flashing receiver 21 may be arranged while the right and left are reversed (namely, the positions of the cap 20 and the flashing receiver 21 may be replaced with each other).

The subtank 7 and the four ink-jet heads 8 are carried on the carriage 6, and are reciprocatively moved in the scanning direction together with the carriage 6. The subtank 7 is connected to a cartridge holder 15 via tubes 17. An ink cartridge or ink cartridges 16 of one color or a plurality of colors (four colors in this embodiment) is/are installed to the cartridge holder 15. The four colors are exemplified, for example, by black, yellow, cyan, and magenta.

Four ink chambers (not depicted) are formed at the inside of the subtank 7. The four color inks, which are supplied from the four ink cartridges 16, are stored in the four ink chambers, respectively.

The four ink-jet heads 8 are aligned in the scanning direction on the lower side of the subtank 7. A nozzle plate 87 (to be described later on) is present in the lower surface of each of the ink-jet heads 8. A plurality of nozzles 80 (see FIG. 2) are formed in the nozzle plate 87. One ink-jet head 8 corresponds to one color ink, and is connected to one of the four ink chambers. That is, the four ink-jet heads 8 correspond to the four color inks respectively, and are connected to the four ink chambers respectively.

The ink-jet head 8 is provided with an ink supply port and an ink discharge port. The ink supply port and the ink discharge port are connected to the ink chamber of the subtank 7, for example, via tubes. A circulating pump is interposed between the ink supply port and the ink chamber.

The ink, which is fed from the ink chamber by the circulating pump, passes through the ink supply port to flow into the ink-jet head 8, and the ink is discharged (ejected) from the nozzle 80. The ink, which has not been discharged from the nozzle 80, passes through the ink discharge port, and the ink returns to the ink chamber. The ink is circulated between the ink chamber and the ink-jet head 8. The four ink-jet heads 8 discharge the four color inks supplied from the subtank 7 onto the recording paper 200, while being moved in the scanning direction together with the carriage 6.

As depicted in FIG. 1, the conveying roller 4 is arranged on the upstream side (rear side) in the conveying direction with respect to the platen 2. The conveying roller 5 is arranged on the downstream side (front side) in the conveying direction with respect to the platen 2. The two conveying rollers 4, 5 are synchronously driven by a motor (not depicted). The two conveying rollers 4, 5 convey the recording paper 200 placed on the platen 2 in the conveying direction orthogonal to the scanning direction. The printing apparatus 1 is provided with a controller 50. The controller 50 is provided with, for example, CPU or a logic circuit (for example, FPGA), and a memory (storage) 55 such as a nonvolatile memory, a hard disk, a RAM, etc. The controller 50 receives a printing job and driving waveform data from an external device 100, and the controller 50 stores the printing job and the driving waveform data in the memory 55. The controller 50 controls the driving of, for example, the ink discharge device 3 and the conveying roller 4 on the basis of the printing job so as to execute a print processing.

For example, the non-volatile memory or the hard disk stores a control program of the printing apparatus 1. The CPU reads the control program into the RAM and executes the print processing. The controller 50 may install the control program stored in a recording medium 65 such as a flash memory or an optical disk, etc., to the non-volatile memory or the hard disk. Alternatively, the controller 50 may download the control program stored in a server to the non-volatile memory or the hard disk, via a network. Still alternatively, the controller 50 may be connected to the body of the printing apparatus via a wireless or wired connection and remotely control the body of the printing apparatus. Alternatively, a single controller 50 may control a plurality of pieces of the body of the printing apparatus.

Figure 2:
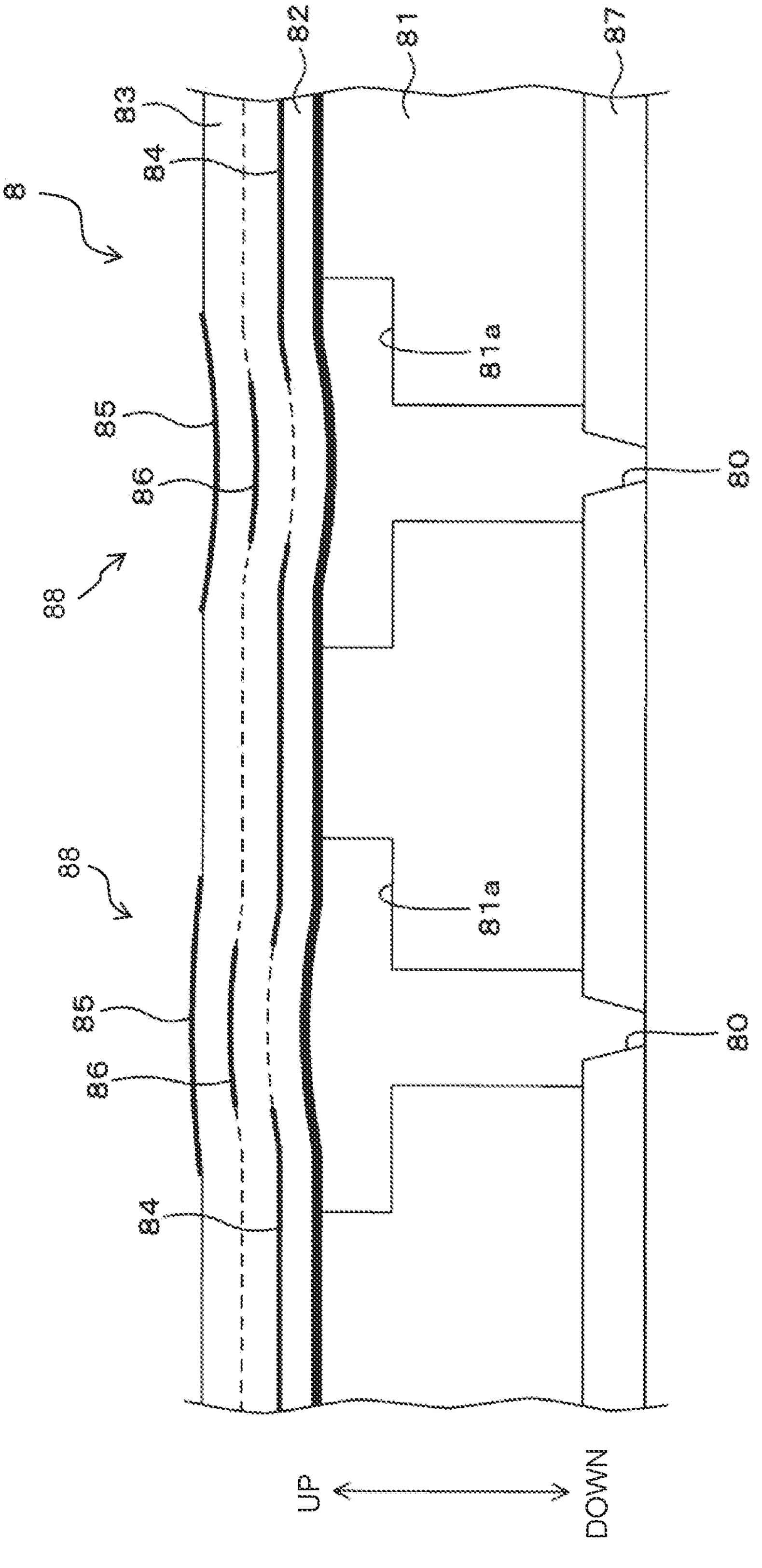
FIG. 2 is a partial enlarged sectional view schematically depicting an ink-jet head.

FIG. 2 is a partial enlarged sectional view schematically illustrative of the ink-jet head 8. The ink-jet head 8 is provided with a channel member 81 and a plurality of pressure chambers 81*a* formed in the channel member 81. A channel (flow channel) including the plurality of pressure chambers 81*a* is formed in the channel member 81. The plurality of pressure chambers 81 constitutes a plurality of pressure chamber arrays. A vibration plate 82 is formed at a location above the pressure chamber 81*a*. A layered piezoelectric member 83 is formed at a location above the vibration plate 82. A first common electrode 84 is formed at a location which is between the piezoelectric member 83 and the vibration plate 82 and above each of the pressure chambers 81*a*.

A second common electrode 86 is provided at the inside of the piezoelectric member 83. The second common electrode 86 is arranged at a location which is above each of the pressure chambers 81*a* and above the first common electrode 84. The second common electrode 86 is arranged at a position at which the second common electrode 86 does not face (is not opposed to) the first common electrode 84. An individual electrode 85 is formed on the upper surface of the piezoelectric member 83 at a location above each of the pressure chambers 81*a*. The individual electrode 85 faces the first common electrode 84 and the second common electrode 86 in the up-down direction, with the piezoelectric member 83 being interposed between the individual electrode 85 and the first common electrode 84 or the second common electrode 86. The vibration plate 82, the piezoelectric member 83, the first common electrode 84, the individual electrode 85, and the second common electrode 86 constitute an actuator 88.

A nozzle plate 87 is provided at a location below the respective pressure chambers 81*a*. Namely, the channel member 81 is adjacent to the nozzle plate 87. A plurality of nozzles 80, which penetrates through the nozzle plate 87 in the up-down direction, is formed in the nozzle plate 87. Each of the nozzles 80 is arranged at a location below one of the plurality of pressure chambers 81*a*. Each of the plurality of nozzles 80 and one of the plurality of pressure chambers 81*a* are communicated with each other. The plurality of nozzles 80 constitutes a plurality of nozzle arrays each of which extends along one of the plurality of pressure chamber arrays.

The first common electrode 84 is connected to a COM terminal, i.e. the ground in this embodiment. The second common electrode 86 is connected to a VCOM terminal. The VCOM voltage is higher than the COM voltage. The individual electrode 85 is connected to a switch group 54 (see FIG. 3). A High or Low voltage is applied to the individual electrode 85, which in turn deforms the piezoelectric member 83, and the vibration plate 82 is vibrated thereby. The ink is discharged from the pressure chamber 81*a* via the nozzle 80 in accordance with the vibration of the vibration plate 82.

Figure 3:
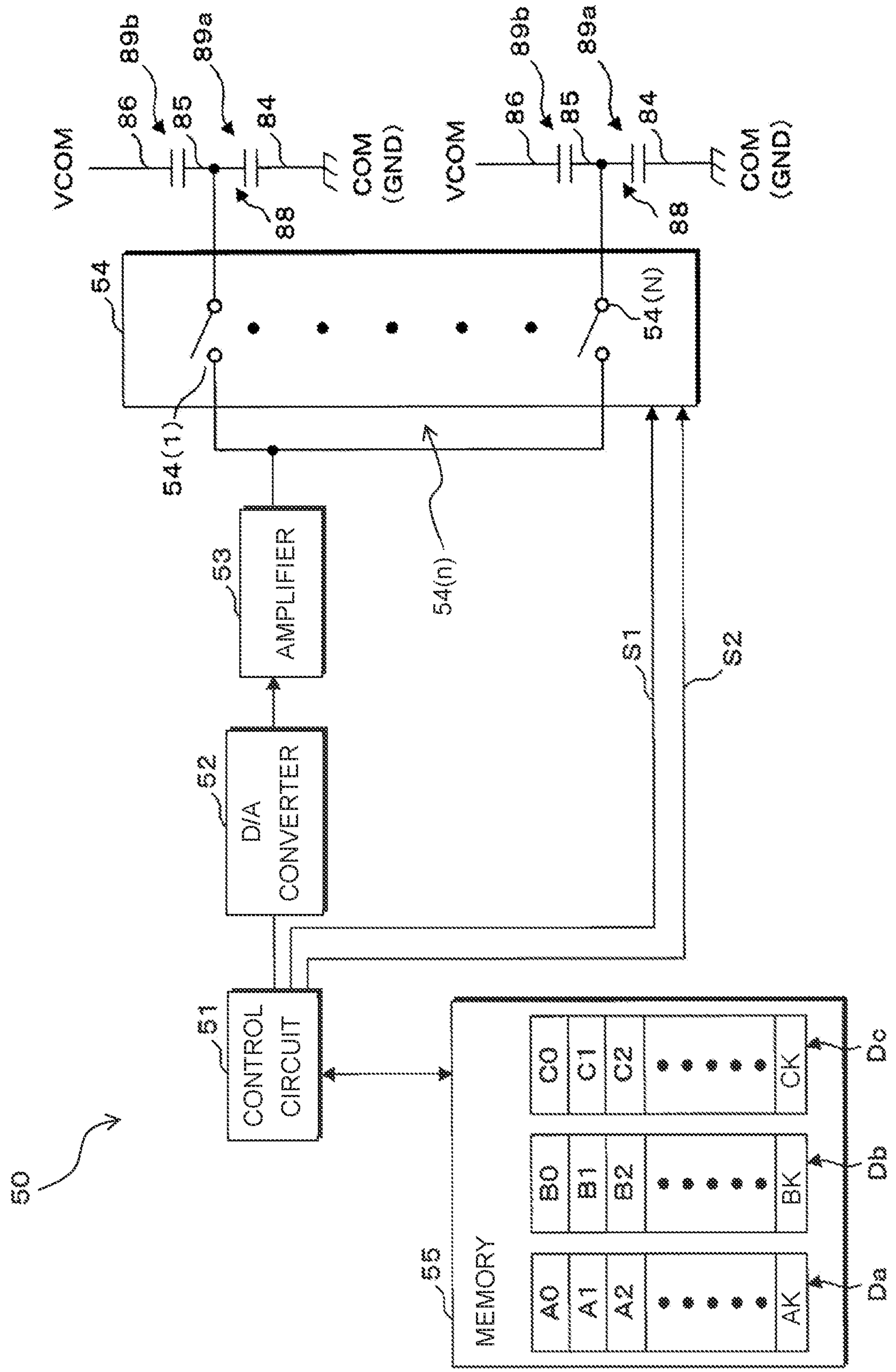
FIG. 3 is a block diagram of a controller.

FIG. 3 is a block diagram of the controller 50. The controller 50 is provided with a control circuit 51, a D/A converter (digital-analog converter) 52, an amplifier 53, the switch group 54, and a memory 55. The driving waveform data is stored in the memory 55. The driving waveform data is data which represents a voltage waveform applied to the individual electrode 85, i.e., a driving waveform for driving the actuator 88. The driving waveform data is the quantized data. In this embodiment, driving waveform data Da, driving waveform data Db and driving waveform data Dc are stored in the memory 55.

The D/A converter 52 converts a digital signal into an analog signal. The amplifier 53 amplifies the analog signal. The switch group 54 is provided with a plurality of nth switches 54(*n*) (n=1, 2, . . . , N). Each of the plurality of nth switches 54(*n*) is configured, for example, by an analog switch IC. One end of each of the plurality of nth switches 54(*n*) is connected to the amplifier 53 via a common bus. The other end of each of the plurality of nth switches 54(*n*) is connected to the individual electrode 85 corresponding to each of the plurality of nozzles 80. In other words, one piece of the nth switch 54(*n*) is provided for one piece of the actuator 88.

A first capacitor 89*a* is configured by the individual electrode 85, the first common electrode 84, and the piezoelectric member 83. A second capacitor 89*b* is configured by the individual electrode 85, the second common electrode 86, and the piezoelectric member 83.

Figure 4:
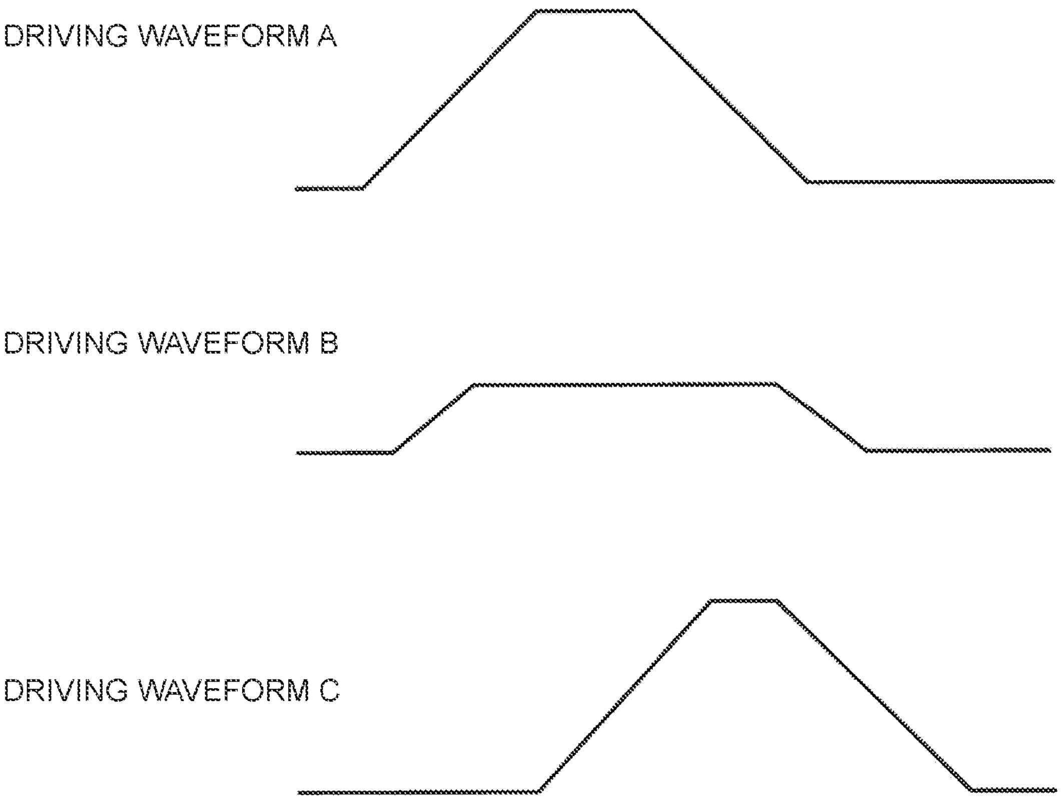
FIG. 4 is an explanatory view to explain examples of driving waveforms.

FIG. 4 is an explanatory view to explain examples of driving waveforms A, B, C. Each of the driving waveforms A, B, C is a waveform which is provided in order that the piezoelectric member 83 is deformed, that the vibration plate 82 is vibrated, and that the ink, which is present in the pressure chamber 81*a*, is discharged via the nozzle 80 after allowing the ink to pass through a descender in accordance with the vibration of the vibration plate 82. For example, the driving waveform A is a waveform which is provided in order to discharge a large droplet (large-sized droplet). The driving waveform B is a waveform which is provided in order to discharge a middle droplet (medium-sized droplet). Although the driving waveform C is a waveform which is provided in order to discharge the large droplet, the driving waveform C has a discharge timing different from that of the driving waveform A. In FIG. 4, the right side of the drawing indicates the past state with respect to the left side of the drawing. The states depicted in FIGS. 5 to 11 are depicted in the same manner as described above. The driving waveform data Da is quantized data of the driving waveform A, the driving waveform data Db is quantized data of the driving waveform B, and the driving waveform data Dc is quantized data of the driving waveform C. The driving waveform data Da has quantized data Ak (k=0, 1, 2, . . . , K), the driving waveform data Db has quantized data Bk (k=0, 1, 2, . . . , K), and the driving waveform data Dc has quantized data Ck (k=0, 1, 2, . . . , K).

Figure 5:
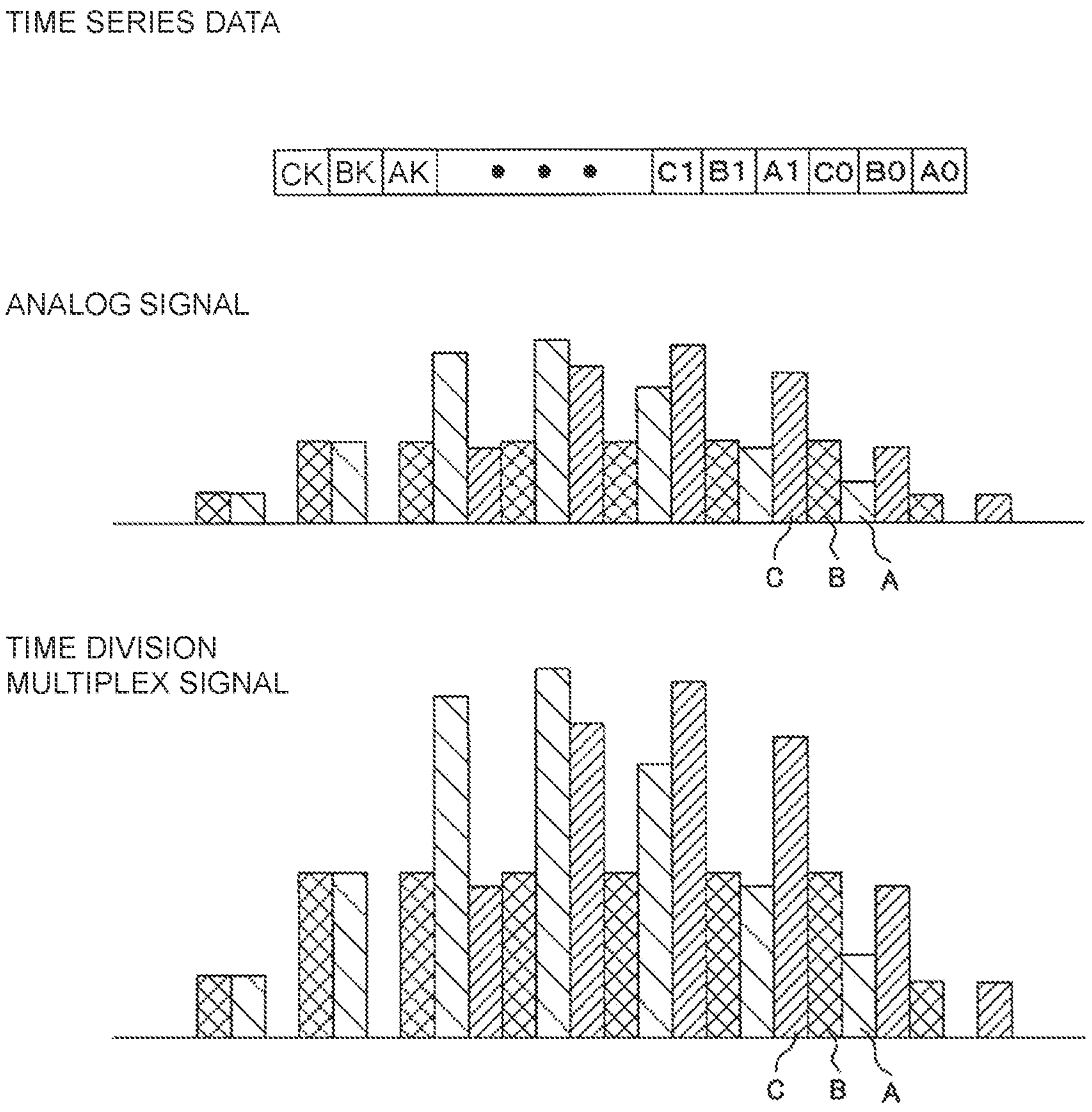
FIG. 5 is an explanatory view to explain examples of time series data, an analog signal, and a time division multiplex signal.

FIG. 5 is an explanatory view to explain examples of the time series data, the analog signal, and the time division multiplex signal. In FIG. 5, A, B, C indicate the correspondence to the driving waveforms A, B, C respectively. In a case that the actuator 88 is driven, the control circuit 51 accesses the memory 55 to obtain the driving waveform data Da, Db, Dc so as to prepare time series data. In the time series data, the data Ak, Bk, Ck are successively aligned while providing a time interval Δt therebetween. The data Ak, Bk, Ck are aligned in an order of A0, B0, C0, A1, B1, C1, . . . , AK, BK, CK. The time series data is a digital signal. Note that the time interval Δt is a reciprocal of a predetermined sampling frequency.

The quantized data Ak, Bk, Ck are aligned in the order of A0, B0, C0, A1, B1, C1, . . . , AK, BK, CK for every time (at a time interval) corresponding to the reciprocal of the predetermined sampling frequency. In other words, the data length of each of the quantized data Ak, Bk, Ck is not more than a length corresponding to the reciprocal of the predetermined sampling frequency. Further, the quantized data A0 is continuous with the quantized data B0, the quantized data B0 is continuous with the quantized data C0, and the quantized data C0 is continuous with the quantized data A1. In other words, the quantized data C0, any other quantized data, and any data of any other waveform are absent between the quantized data A0 and the quantized data B0. Further, the quantized data A0, any other quantized data, and any data of any other waveform are absent between the quantized data B0 and the quantized data C0. Further, the quantized data B0, any other quantized data, and any data of any other waveform are absent between the quantized data C0 and the quantized data A1. Note that the sampling frequency is 24 MHz. The data length of each of the quantized data Ak, Bk, Ck is approximately 41 ns.

The control circuit 51 outputs the time series data to the D/A converter 52. As depicted in FIG. 5, the D/A converter 52 converts the time series data into the analog signal and outputs the analog signal to the amplifier 53. The amplifier 53 amplifies the inputted analog signal and outputs the amplified signal to the switch group 54. As depicted in FIG. 5, the analog signal, which is amplified by the amplifier 53, configures a time division multiplex signal. In other words, the time division multiplex signal is not an analog signal which corresponds to only the data Ak, an analog signal which corresponds to only the data Bk, and an analog signal which corresponds to only the data Ck. Further, the time division multiplex signal is such a signal that at least an analog signal corresponding to a set of three data in total, i.e., a set of one data Ak, one data Bk, and one data Ck and an analog signal corresponding to a set of three data in total, i.e., a set of one data Ak+1, one data Bk+1, and one data Ck+1 are continued in time series.

For example, the number of the time division multiplex signal is one in FIG. 5. With reference to FIG. 5, an analog signal corresponding to the data C0 seems to be isolated. However, such a situation results from the fact that an analog signal, which corresponds to a set of three data in total, i.e., a set of data A0, data B0, and data C0 and which is in such a state that the data A0 and the data B0 are zero, is continued in time series to an analog signal which corresponds to a set of three data in total, i.e., a set of data A1, data B1, and data C1 and which is in such a state that the data A1 is zero. Further, an analog signal corresponding to the set of the data AK and the data BK seems to be isolated. However, such a situation results from the fact that an analog signal, which corresponds to a set of three data in total, i.e., a set of data AK−1, data BK−1, and data CK−1 and which is in such a state that the data CK−1 is zero, is continued in time series to an analog signal which corresponds to a set of three data in total, i.e., a set of the data AK, the data BK, and the data CK. Further, the reason, why an analog signal corresponding to a set of the data AK−1 and the data BK−1 seems to be isolated, is the same as or equivalent to the above. Therefore, the analog signal depicted in FIG. 5 can be dealt with as one time division multiplex signal.

In the time division multiplex signal, it is assumed that a portion corresponding to the data Ak−1 is designated as "first portion", a portion corresponding to the data Ak is designated as "second portion", a portion corresponding to the data Bk−1 is designated as "third portion", and a portion corresponding to the data Bk is designated as "fourth portion". On this assumption, the third portion is present (aligned) between the first portion and the second portion, and the second portion is present (aligned) between the third portion and the fourth portion. In other words, the first portion is continuous with the third portion, the third portion is continuous with the second portion, and the second portion is continuous with the fourth portion. That is, the second portion, the fourth portion, and any other waveform are absent between the first portion and the third portion in the time division multiplex signal. Further, the first portion, the fourth portion, and any other waveform are absent between the third portion and the second portion in the time division multiplex signal. Further, the first portion, the third portion, and any other waveform are absent between the second portion and the fourth portion in the time division multiplex signal.

Note that the same or equivalent relationship also holds between the data Ak and the data Ck, and the same or equivalent relationship also holds between the data Bk and the data Ck. The control circuit 51, the D/A converter 52, the amplifier 53, and the memory 55 configure a signal generator (multiplexer, multiplexing unit). One time division multiplex signal is included in one discharge driving cycle. For example, in a case that a discharge driving frequency (jetting frequency) is 100 kHz, one discharge driving cycle (jetting cycle) is 10 μs, and one time division multiplex signal has a length which is less than 10 μs. It is preferable that not less than three pieces of the data Ak, not less than three pieces of the data Bk and not less than three pieces of the data Ck are present in one time division multiplex signal. The reason will be described later on.

The control circuit 51 outputs, to the switch group 54, a switch control signal S1 for controlling the opening and closing of the plurality of nth switches 54(*n*), a synchronization signal S2*a* corresponding to the driving waveform A, a synchronization signal S2*b* corresponding to the driving waveform B, and a synchronization signal S2*c* corresponding to the driving waveform C. Note that the three synchronization signals S2*a*, S2*b*, S2*c* are simply expressed as "synchronization signal S2" as well (see FIG. 3). The switch control signal S1 includes first selection information which indicates that any one of the plurality of nth switches 54(*n*) is selected, and second selection information which indicates that any one of the three synchronization signals S2*a*, S2*b*, S2*c* is selected. The first selection information and the second selection information are linked.

Figure 6:
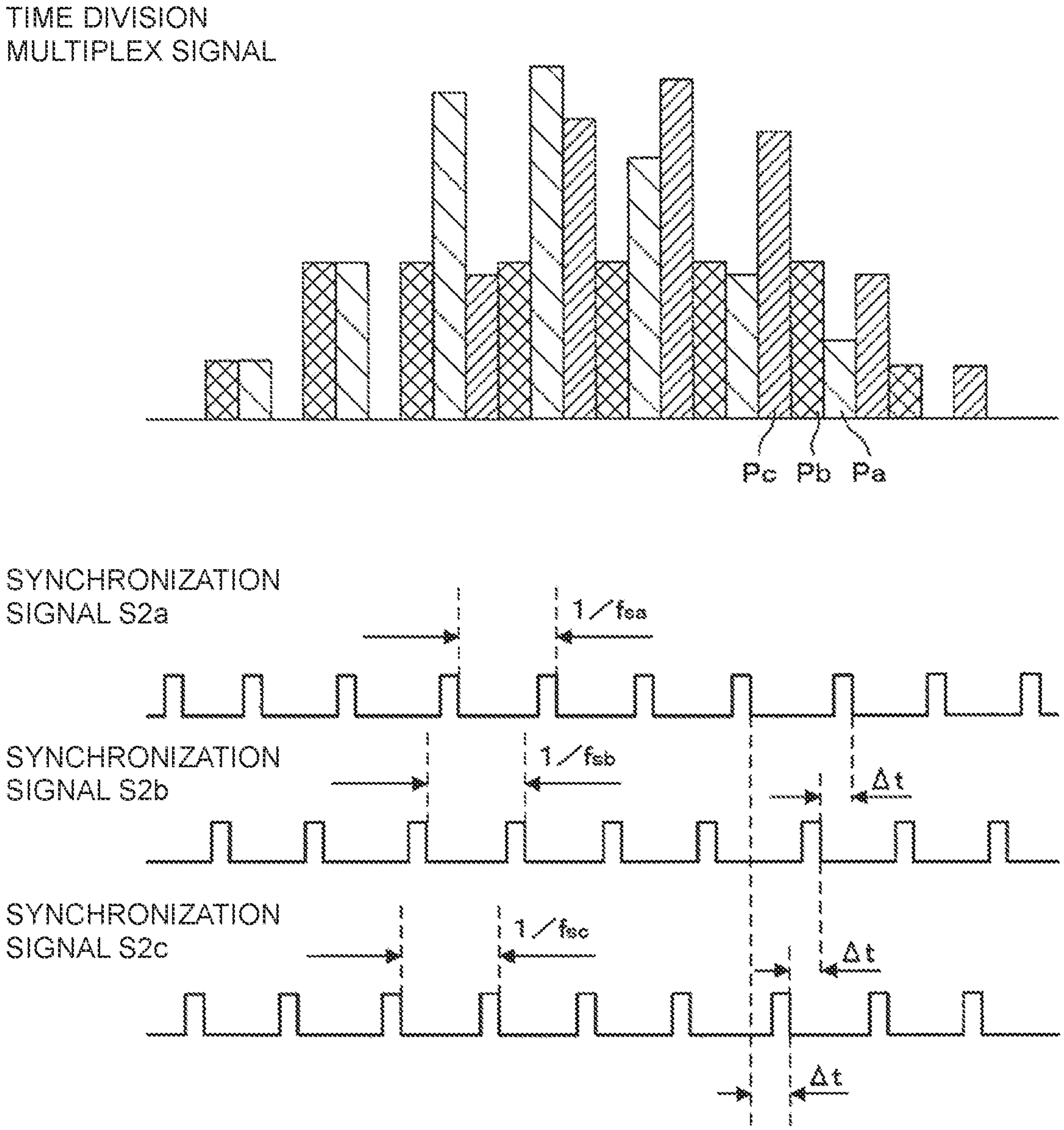
FIG. 6 is an explanatory view to explain the relationship between the time division multiplex signal and synchronization signals.

FIG. 6 is an explanatory view for explaining a relationship between the time division multiplex signal and the synchronization signals S2*a*, S2*b*, S2*c*. Each of the synchronization signals S2*a*, S2*b*, S2*c* is a pulse wave. The time interval Δt is provided between a rising point of time of the pulse of the synchronization signal S2*a* and a rising point of time of the pulse of the synchronization signal S2*b*. Further, the time interval Δt is provided between the rising point of time of the pulse of the synchronization signal S2*b* and the rising point of time of the pulse of the synchronization signal S2*c*, and the time interval Δt is provided between the rising point of time of the pulse of the synchronization signal S2*c* and the rising point of time of the pulse of the synchronization signal S2*a*.

As described above, the data Ak, Bk, Ck, which configure the time series data, are successively aligned while providing the time intervals Δt therebetween. On this account, in a case that the time division multiplex signal is accessed at the rising point of time of the pulse of the synchronization signal S2*a*, it is possible to obtain a driving waveform signal Pa which corresponds to the data Ak and which represents the driving waveform A. In a case that the time division multiplex signal is accessed at the rising point of time of the pulse of the synchronization signal S2*b*, it is possible to obtain a driving waveform signal Pb which corresponds to the data Bk and which represents the driving waveform B. In a case that the time division multiplex signal is accessed at the rising point of time of the pulse of the synchronization signal S2*c*, it is possible to obtain a driving waveform signal Pc which corresponds to the data Ck and which represents the driving waveform C. Namely, one nth switch 54(*n*) separates, from the time division multiplex signal, the first portion corresponding to the data Ak−1 and the second portion corresponding to the data Ak with the first pulse signal, and separates, from the time division multiplex signal, the third portion corresponding to the data Bk−1 and the fourth portion corresponding to the data Bk with the second pulse signal. In other words, one type of the time division multiplex signal is inputted into one nth switch 54(*n*), and the one nth switch 54(*n*) separates any one of the driving waveform signal Pa which represents the driving waveform A, the driving waveform signal Pb which represents the driving waveform B, and the driving waveform signal Pc which represents the driving waveform C.

The switch group 54 opens and closes the selected nth switch 54(*n*) at opening and closing timings indicated by any one of the synchronization signal S2*a* to S2*c* which has been selected. In other words, the switch group 54 opens and closes the nth switch 54(*n*) with the predetermined sampling frequency.

A frequency for sampling the time division multiplex signal so as to separate the driving waveform signal Pa is referred to as a first sampling frequency fsa, a frequency for sampling the time division multiplex signal so as to separate the driving waveform signal Pb is referred to as a second sampling frequency fsb, and a frequency for sampling the time division multiplex signal so as to separate the driving waveform signal Pc is referred to as a third sampling frequency fsc. The reciprocal of the first sampling frequency fsa is a first sampling cycle 1/fsa, the reciprocal of the second sampling frequency fsb is a second sampling cycle 1/fsb and the reciprocal of the third sampling frequency fsc is a third sampling cycle 1/fsc. As depicted in FIG. 6, a time (time interval) between the pulses of the synchronization signal S2*a* is the first sampling cycle 1/fsa, a time between the pulses of the synchronization signal S2*b* is the second sampling cycle 1/fsb, and a time between the pulses of the synchronization signal S2*c* is the third sampling cycle 1/fsc.

In a case that a resonance frequency of the ink-jet head 8 is "fr", the first sampling frequency fsa is less than the resonance frequency fr, the second sampling frequency fsb is less than the resonance frequency fr and the third sampling frequency fsc is less than the resonance frequency fr. The resonance frequency fr can be obtained in the following manner. The 1/fr which is the reciprocal of the resonance frequency fr is the resonance cycle. The half of the resonance frequency fr, that is ½fr is an acoustic length AL (Acoustic Length) of a channel including the pressure chamber 81*a*. The AL can be obtained, by measuring the velocity of an ink droplet discharged when a driving pulse of a rectangular wave is applied to the individual electrode 85 while changing the pulse width of the rectangular wave but maintaining the voltage value of the rectangular wave at a constant value, as a pulse width with which a discharging velocity of an ink droplet is maximized. Namely, the resonance frequency fr can be obtained from the acoustic length AL. Note that the resonance frequency fr is an example of "a resonance frequency at a nozzle".

Figure 7:
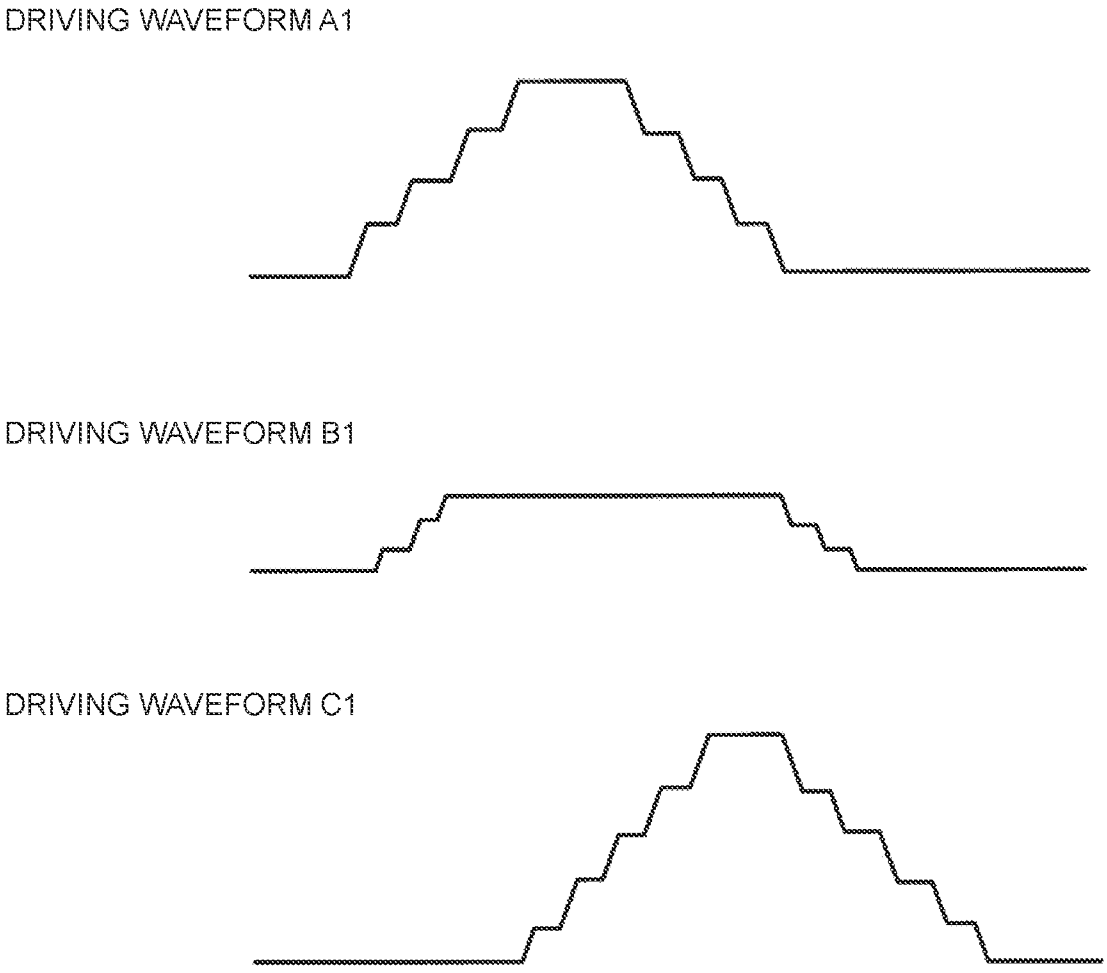
FIG. 7 is a schematic view of driving waveforms inputted into an actuator by opening and closing of an nth switch.

FIG. 7 is a schematic view of the driving waveform inputted into the actuator 88 by opening and closing of the nth switch 54(*n*). In a case that the synchronization signal S2*a* is selected, the switch group 54 closes the nth switch 54(*n*) under a condition that the pulse of the synchronization signal S2*a* is in a high level interval (period), or the switch group 54 opens the nth switch 54(*n*) under a condition that the pulse of the synchronization signal S2*a* is in a low level interval (period). The electric charge, which is applied to the individual electrode 85 in a case that the nth switch 54(*n*) is closed, is retained by the first capacitor 89*a* and the second capacitor 89*b*. As depicted in FIG. 7, the driving waveform A1 is inputted into the actuator 88. In other words, the driving waveform signal Pa is separated from the time division multiplex signal by sampling the time division multiplex signal with the first sampling frequency fsa. The actuator 88 is driven by the driving waveform signal Pa. Note that not less than three pieces of the data Ak are required in order to express the concave and convex of the driving waveform signal Pa.

In a case that the synchronization signal S2*b* is selected, the switch group 54 closes the nth switch 54(*n*) under a condition that the pulse of the synchronization signal S2*b* is in the high level interval, or the switch group 54 opens the nth switch 54(*n*) under a condition that the pulse of the synchronization signal S2*b* is in the low level interval. The electric charge, which is applied to the individual electrode 85 in a case that the nth switch 54(*n*) is closed, is retained by the first capacitor 89*a* and the second capacitor 89*b*. As depicted in FIG. 7, the driving waveform B1 is inputted into the actuator 88. In other words, the driving waveform signal Pb is separated from the time division multiplex signal by sampling the time division multiplex signal with the second sampling frequency fsb. The actuator 88 is driven by the driving waveform signal Pb. Note that not less than three pieces of the data Bk are required in order to express the concave and convex of the driving waveform signal Pb.

In a case that the synchronization signal S2*c* is selected, the switch group 54 closes the nth switch 54(*n*) under a condition that the pulse of the synchronization signal S2*c* is in the high level interval, or the switch group 54 opens the nth switch 54(*n*) under a condition that the pulse of the synchronization signal S2*c* is in the low level interval. The electric charge, which is applied to the individual electrode 85 in a case that the nth switch 54(*n*) is closed, is retained by the first capacitor 89*a* and the second capacitor 89*b*. As depicted in FIG. 7, the driving waveform C1 is inputted into the actuator 88. In other words, the driving waveform signal Pc is separated from the time division multiplex signal by sampling the time division multiplex signal with the third sampling frequency fsc. The actuator 88 is driven by the driving waveform signal Pc. Note that not less than three pieces of the data Ck are required in order to express the concave and convex of the driving waveform signal Pc.

As described above, each of the first to third sampling frequencies fsa, fsb and fsc is less than the resonance frequency fr of the ink-jet head 8. The resonance frequency fr of the ink-jet head 8 is either a resonance frequency in a case that an ink (liquid) is not filled in the pressure chamber 81*a* or a resonance frequency in a case that the ink is filled in the pressure chamber 81*a*. For example, in a case that the resonance frequency of the ink-jet head 8 in the case that the ink is not filled in the pressure chamber 81*a* is 100 kHz, the resonance frequency of the ink-jet head 8 in the case that the ink is filled in the pressure chamber 81*a* is less than 100 kHz. Specifically, the resonance frequency of the ink-jet head 8 in the case that the ink is filled in the pressure chamber 81*a* is 90 kHz. Namely, the resonance frequency of the ink-jet head 8 in the case that the ink is not filled in the pressure chamber 81*a* is greater than the resonance frequency of the ink-jet head 8 in the case that the ink is filled in the pressure chamber 81*a*.

In the printing apparatus 1 according to the first embodiment, the time division multiplex signal is sampled with the first to third sampling frequencies fsa, fsb and fsc each of which is less than the resonance frequency fr at the channel so as to separate, respectively, the driving waveform signals Pa, Pb and Pc from the time division multiplex signal, thereby making it possible to suppress any unnecessary increase in the sampling frequency. As the sampling frequency is increased, the power consumption during the driving of the switch group 54 is increased. By suppressing any unnecessary increase in the sampling frequency, it is possible to suppress any unnecessary increase in the power consumption.

Figure 8:
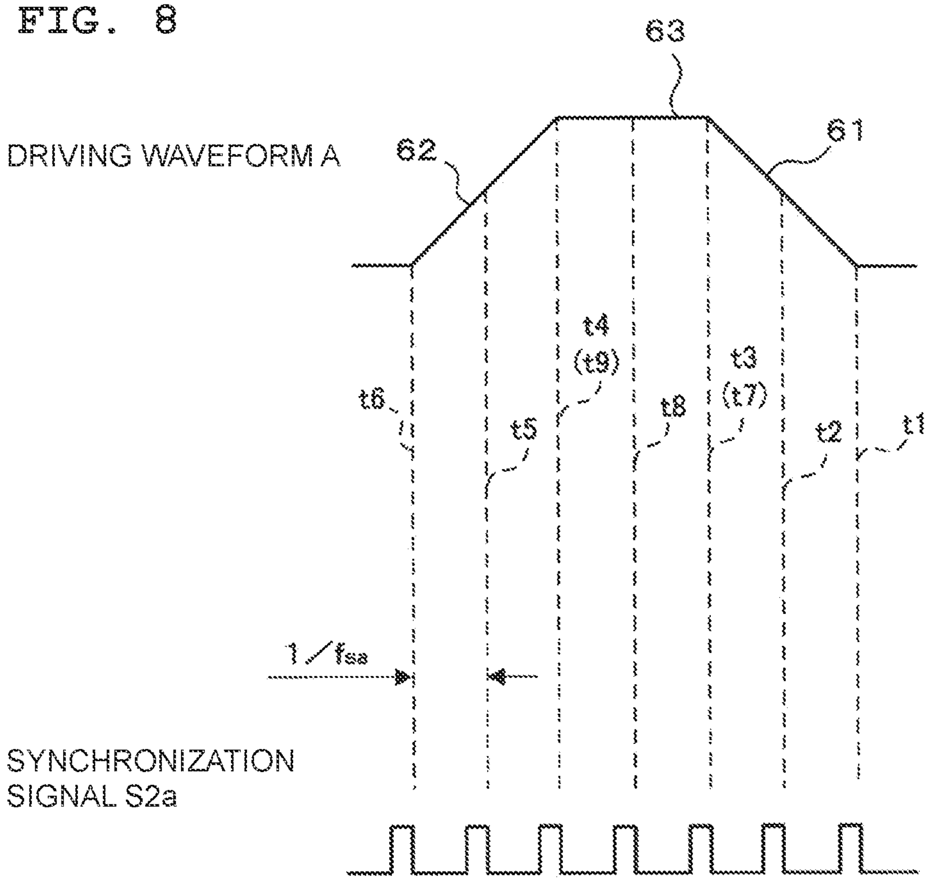
FIG. 8 is an explanatory view to explain a relationship between a driving waveform and a synchronization signal.

The present disclosure will be explained below on the basis of the drawings which depict a printing apparatus 1 according to a second embodiment. Constitutive components according to the second embodiment, which are the same as or equivalent to the constitutive components according to the first embodiment, are designated by the same reference numerals as those of the first embodiment, any detailed explanation of which will be omitted. FIG. 8 is an explanatory view to explain the relationship between a driving waveform A (note that the driving waveform A of the second embodiment may be same as or different from the waveform A of the first embodiment) and a synchronization signal S2*a*. The driving waveform A has a rising part 61, a falling part 62 and an intermediate part 63. The rising part 61 is, for example, a part, in the driving waveform A, from a minimum voltage up to a maximum voltage in a case that the voltage rises from the minimum voltage up to the maximum voltage. The falling part 62 is, for example, a part, in the driving waveform A, from the maximum voltage down to the minimum voltage in a case that the voltage falls from the maximum voltage down to the minimum voltage. The intermediate part 63 is a part, in the driving waveform A, between the rising part 61 and the falling part 62. The intermediate part 63 is a part in which the voltage is constant.

In FIG. 8, "t1" is a first point of time at which the rising of voltage in the rising part 61 is started, "t3" is a third point of time at which the rising of voltage in the rising part 61 is ended, and "t2" is a second point of time which is a point of time between the first point of time t1 and the third point of time t3. Namely, the second point of time t2 is a point of time after the first point of time t1 and the third point of time t3 is a point of time after the second point of time t2.

In FIG. 8, "t4" is a fourth point of time at which the falling of voltage in the falling part 62 is started, "t6" is a sixth point of time at which the falling of voltage in the falling part 62 is ended, and "t5" is a fifth point of time which is a point of time between the fourth point of time t4 and the sixth point of time t6. Namely, the fifth point of time t5 is a point of time after the fourth point of time t4 and the sixth point of time t6 is a point of time after the fifth point of time t5. In FIG. 8, "t8" is a point of time in the intermediate part 63 and is an eighth point of time between the third point of time t3 and the fourth point of time t4.

The pulse of the synchronized signal S2*a* rises at each of the first to third point of times t1 to t3, the fourth to sixth point of times t4 to t6 and the eighth point of time t8. The time division multiplex signal is sampled at each of the first to third point of times t1 to t3, the fourth to sixth point of times t4 to t6 and the eighth point of time t8. Note that the third point of time t3 corresponds to a seventh point of time t7, and the fourth point of time t4 corresponds to a ninth point of time t9. Namely, the eighth point of time t8 is a point of time after the seventh point of time t7, and the ninth point of time t9 is a point of time after the eighth point of time t8. The seventh point of time t7 is a point of time in the intermediate part 63, and is a point of time before the eighth point of time t8. The ninth point of time t9 is a point of time in the intermediate part 63, and is a point of time after the eighth point of time t8.

The control circuit 51 samples the time division multiplex signal with the first sampling frequency fsa which is less than the resonance frequency fr. Namely, the controller 50 performs the sampling at the first point of time t1, the second point of time t2 and the third point of time t3, performs the sampling at the fourth point of time t4, the fifth point of time t5 and the sixth point of time t6 and performs the sampling at the seventh point of time t7, the eighth point of time t8 and the ninth point of time t9.

The driving waveform B different from the driving waveform A also has a rising part, a falling part and an intermediate part. The controller 50 samples the time division multiplex signal with the second sampling frequency fsb which is less than the resonance frequency fr. Namely, the controller 50 performs the sampling at the first point of time, the second point of time and the third point of time, performs the sampling at the fourth point of time, the fifth point of time and the sixth point of time and performs the sampling at the seventh point of time, the eighth point of time and the ninth point of time. The value of the second sampling frequency fsb is same as the value of the first sampling frequency fsa. In other words, the value of the first sampling frequency fsa which is less than the resonance frequency fr and which is applied to the rising part and the falling part of the driving waveform A and the value of the second sampling frequency fsb which is less than the resonance frequency fr and which is applied to the rising part and the falling part of the driving waveform B are same as each other. Further, the value of the first sampling frequency fsa which is less than the resonance frequency fr and which is applied to the intermediate part of the driving waveform A and the value of the second sampling frequency fsb which is less than the resonance frequency fr and which is applied to the intermediate part of the driving waveform B are same as each other.

The driving waveform C different from the driving waveforms A and B also has a rising part, a falling part and an intermediate part. The controller 50 samples the time division multiplex signal with the third sampling frequency fsc which is less than the resonance frequency fr. Namely, the controller 50 performs the sampling at the first point of time, the second point of time and the third point of time, performs the sampling at the fourth point of time, the fifth point of time and the sixth point of time and performs the sampling at the seventh point of time, the eighth point of time and the ninth point of time. The value of the third sampling frequency fsc is same as the value of the first sampling frequency fsa and the value of the second sampling frequency fsb. In other words, the value of the first sampling frequency fsa or the second sampling frequency fsb which is less than the resonance frequency fr and which is applied to the rising part and the falling part of the driving waveform A or the driving waveform B and the value of the third sampling frequency fsc which is less than the resonance frequency fr and which is applied to the rising part and the falling part of the driving waveform C are same as each other. Further, the value of the first sampling frequency fsa or the second sampling frequency fsb which is less than the resonance frequency fr and which is applied to the intermediate part of the driving waveform A or the driving waveform B and the value of the third sampling frequency fsc which is less than the resonance frequency fr and which is applied to the intermediate part of the driving waveform C are same as each other. Note that although the values of the first, second and third sampling frequencies fsa, fsb and fsc are same as each other, sampling point of times are different among the samplings for the driving waveforms A to C.

The value of the first sampling frequency fsa applied to the rising part 61 and the falling part 62 of the first driving waveform, the value of the second sampling frequency fsb applied to the rising part and the falling part of the second driving waveform, and the value of the third sampling frequency fsc applied to the rising part and the falling part of the third driving waveform are same as each other.

The value of the first sampling frequency fsa applied to the intermediate part 63 of the first driving waveform, the value of the second sampling frequency fsb applied to the intermediate part of the second driving waveform and the value of the third sampling frequency fsc applied to the intermediate part of the third driving waveform are same as each other. Note that it is acceptable that the values of the first to third sampling frequencies fsa, fsb and fsc are not same as each other.

The leak current in the actuator 88 is not less than a predetermined current; in a case that a sampling cycle which is a reciprocal of the first sampling frequency fsa, the second sampling frequency fsb or the third sampling frequency fsc less than the resonance frequency fr elapses, a deforming amount by which the actuator 88 is deformed is changed by the leak current, and a volume of the ink discharged from the nozzle is changed by a change in the deforming amount by the leak current. The predetermined current is, for example, a minimum current by which the volume of the ink discharged from the nozzle is changed due to the change in the deforming amount by the leak current in a case that the voltage is applied to the individual electrode 85 and then the sampling cycle elapses. Even in a case that the leak current of the actuator 88 is great, it becomes easy to maintain the voltage of the actuator 88 to a constant value by shortening the sampling cycle. The actuator 88 corresponds to an "energy generating element".

Figure 9:
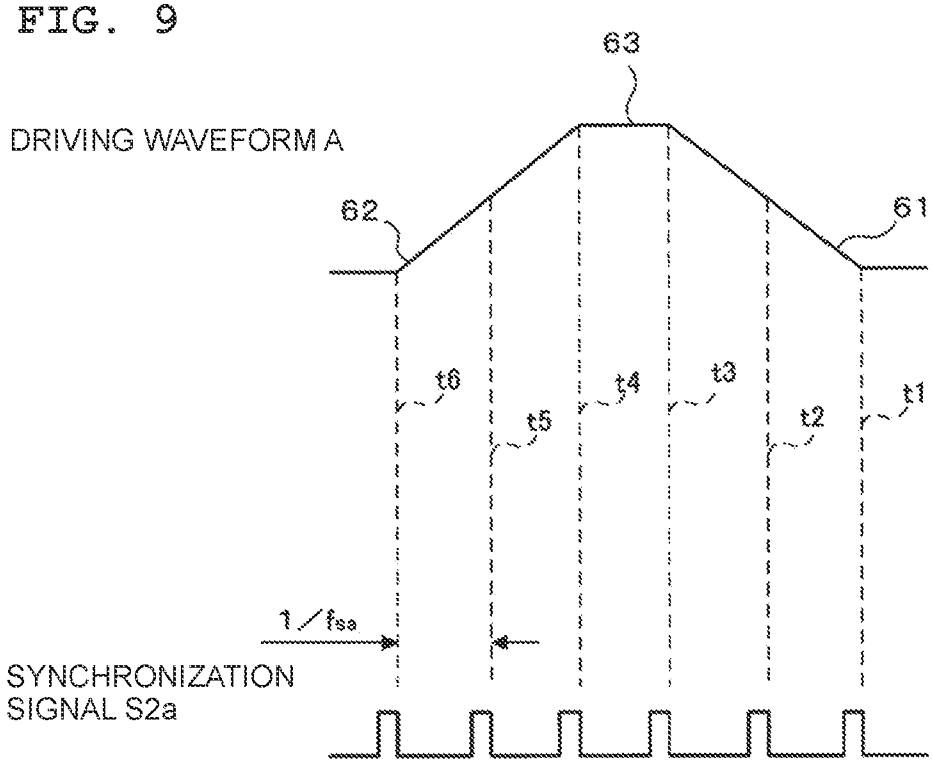
FIG. 9 is an explanatory view to explain a relationship between a driving waveform and a synchronization signal.

The present disclosure will be explained below on the basis of the drawings which depict a printing apparatus 1 according to a third embodiment. Constitutive components according to the third embodiment, which are the same as or equivalent to the constitutive components according to the second embodiment, are designated by the same reference numerals as those of the second embodiment, any detailed explanation of which will be omitted. FIG. 9 is an explanatory view to explain the relationship between a driving waveform A (note that the driving waveform A of the third embodiment may be same as or different from the waveform A of the first embodiment) and a synchronization signal S2*a*. In FIG. 9, the configurations of the rising part 61 and the falling part 62 are same as those of the second embodiment, and thus only the intermediate part 63 will be explained in the following, and the explanation of the rising part 61 and the falling part 62 will be omitted. The intermediate part 63 is a part between the rising part 61 and the falling part 62 in the driving waveform A. The intermediate part 63 is a part in which the voltage is constant. In the third embodiment, the seventh point of time is not present in the intermediate part 63, unlike in the second embodiment, and the both ends of the intermediate part 63 are, respectively, the third point of time t3 and the fourth point of time t4.

The pulse of the synchronized signal S2*a* rises at each of the first to third point of times t1 to t3 and the fourth to sixth point of times t4 to t6. The time division multiplex signal is sampled at each of the first to third point of times t1 to t3, and is sampled at each of the fourth to sixth point of times t4 to t6.

The control circuit 51 samples the time division multiplex signal with the first sampling frequency fsa which is less than the resonance frequency fr. Namely, the controller 50 performs the sampling at the first point of time t1, the second point of time t2 and the third point of time t3 and performs the sampling at the fourth point of time t4, the fifth point of time t5 and the sixth point of time t6.

The driving waveform B different from the driving waveform A also has a rising part, a falling part and an intermediate part. The controller 50 samples the time division multiplex signal with the second sampling frequency fsb which is less than the resonance frequency fr. Namely, the controller 50 performs the sampling at the first point of time, the second point of time and the third point of time, and performs the sampling at the fourth point of time, the fifth point of time and the sixth point of time.

The driving waveform C different from the driving waveforms A and B also has a rising part, a falling part and an intermediate part. The controller 50 samples the time division multiplex signal with the third sampling frequency fsc which is less than the resonance frequency fr. Namely, the controller 50 performs the sampling at the first point of time, the second point of time and the third point of time and performs the sampling at the fourth point of time, the fifth point of time and the sixth point of time. Although the values of the first, second and third sampling frequencies fsa, fsb and fsc are same as each other, sampling point of times are different among the samplings for the driving waveforms A to C.

The value of the first sampling frequency fsa applied to the rising part 61 and the falling part 62 of the first driving waveform, the value of the second sampling frequency fsb applied to the rising part and the falling part of the second driving waveform, and the value of the third sampling frequency fsc applied to the rising part and the falling part of the third driving waveform are same as each other.

The value of the first sampling frequency fsa applied to the intermediate part 63 of the first driving waveform, the value of the second sampling frequency fsb applied to the intermediate part of the second driving waveform and the value of the third sampling frequency fsc applied to the intermediate part of the third driving waveform are same as each other. Note that it is acceptable that the values of the first to third sampling frequencies fsa, fsb and fsc are not same as each other.

The leak current in the actuator 88 is less than a predetermined current; in a case that a sampling cycle which is a reciprocal of the first sampling frequency fsa, the second sampling frequency fsb or the third sampling frequency fsc less than the resonance frequency elapses, a deforming amount by which the actuator 88 is deformed is changed by the leak current, whereas a volume of the ink discharged from the nozzle is not changed by a change in the deforming amount by the leak current. The predetermined current is, for example, a minimum current by which the volume of the ink discharged from the nozzle is changed due to the change in the deforming amount by the leak current in a case that the voltage is applied to the individual electrode 85 and then the sampling cycle elapses. In a case that the leak current of the actuator 88 is small, it is possible to maintain the voltage of the actuator 88 to a constant value even in a case that the sampling cycle is lengthened. The actuator 88 corresponds to the “energy generating element”.

Figure 10:
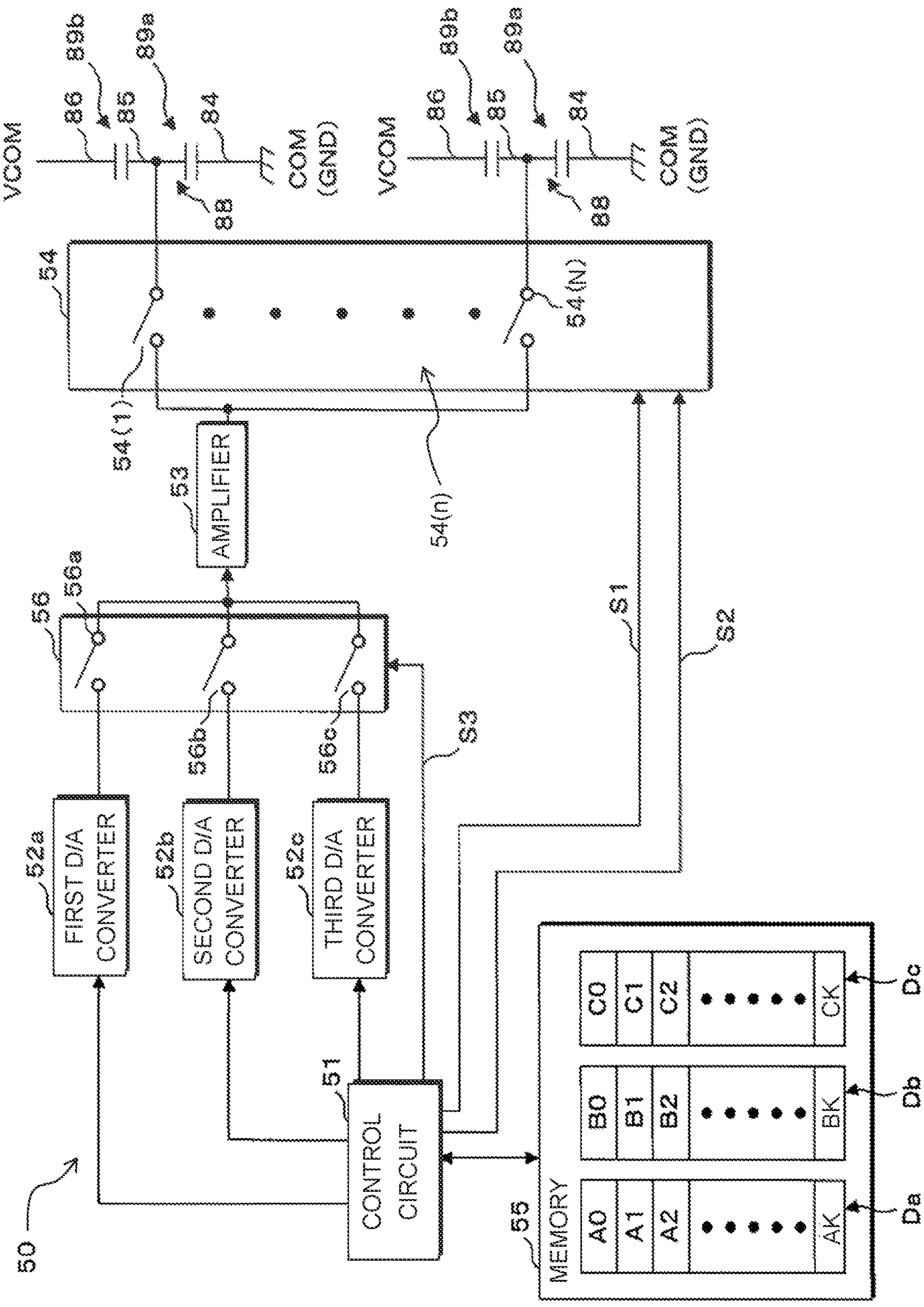
FIG. 10 is a block diagram of a controller.
Figure 11:
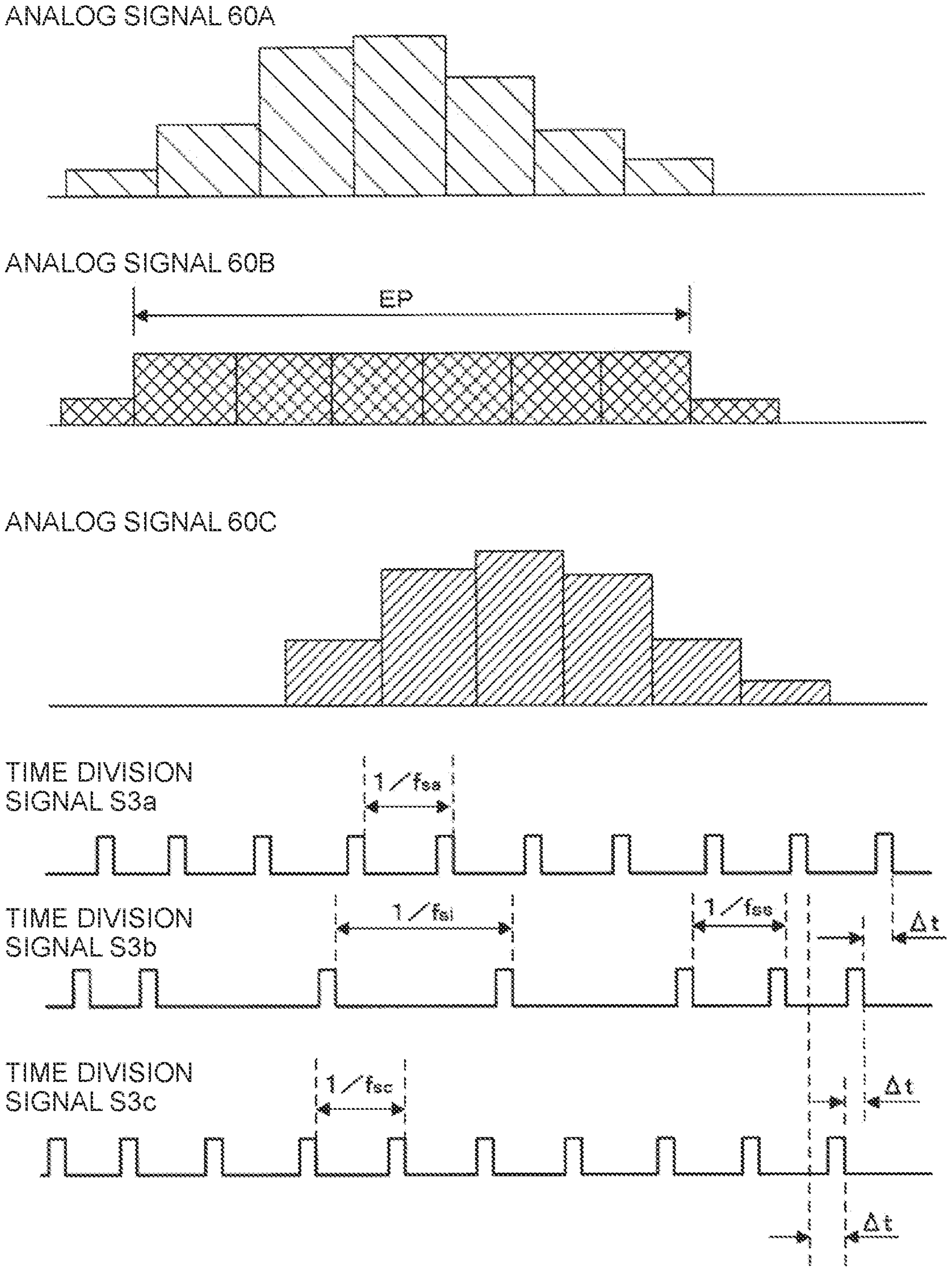
FIG. 11 is an explanatory view to explain a relationship between an analog signal and a time division signal.

The present disclosure will be explained below on the basis of the drawings which depict a printing apparatus 1 according to a fourth embodiment. FIG. 10 is a block diagram of a controller 50, and FIG. 11 is an explanatory view to explain the relationship between analog signals 60A to 60C and time division signals S3*a* to S3*c*. The controller 50 is provided with a control circuit 51, a first D/A converter 52*a*, a second D/A converter 52*b*, a third D/A converter 52*c*, a second switch control unit 56, an amplifier 53, a switch group 54, and a memory 55. The second switch control unit 56 is provided with a first switch 56*a*, a second switch 56*b*, and a third switch 56*c*.

In a case that the actuator 88 is driven, the control circuit 51 accesses the memory 55 to obtain driving waveform data Da and outputs the driving waveform data Da to the first D/A converter 52*a*. The control circuit 51 accesses the memory 55 to obtain driving waveform data Db and outputs the driving waveform data Db to the second D/A converter 52*b*. The control circuit 51 accesses the memory 55 to obtain driving waveform data Dc and outputs the driving waveform data Dc to the third D/A converter 52*c*.

As depicted in FIG. 11, the first D/A converter 52*a*, the second D/A converter 52*b*, and the third D/A converter 52*c* output analog signals 60A, 60B, 60C respectively. The analogue signal 60B represents a same voltage continuously during an equal voltage period EP. The control circuit 51 outputs, to the second switch control unit 56, a time division signal S3*a* which corresponds to the analog signal 60A, a time division signal S3*b* which corresponds to the analog signal 60B, and a time division signal S3*c* which corresponds to the analog signal 60C. Note that the three time division signals S3*a*, S3*b*, S3*c* are simply referred to as “time division signal S3” as well (see FIG. 10). The time division signal S3 is a switching signal by which the opening and closing of each of the first switch 56*a*, the second switch 56*b* and the third switch 56*c* is changed.

Each of the time division signals S3*a*, S3*b* and S3*c* is a pulse wave. A time (time interval) between the pulses of the time division signal S3*a* is same as the first sampling cycle 1/fsa. Namely, a switching frequency of the first switch 56*a* is the first sampling frequency fsa. A time between the pulses of the time division signal S3*c* is same as the third sampling cycle 1/fsc. Namely, a switching frequency of the third switch 56*c* is the third sampling frequency fsc.

A time between the pulses of the time division signal S3*b* is same as the first sampling cycle 1/fsa and the third sampling cycle 1/fsc during a period of time which is different from the equal voltage period EP. In the following, time between the pulses, of the time division signal S3*b*, during the period of time which is different from the equal voltage period EP is referred to as a short sampling cycle 1/fss. During the equal voltage period EP, a time between the pulses of the time division signal S3*b* is longer than the first sampling cycle 1/fsa and the third sampling cycle 1/fsc. In the following, the time between the pulses of the time division signal S3*b* during the equal voltage period EP is referred to as a long sampling cycle 1/fsl.

The short sampling cycle 1/fss is a reciprocal of the sampling frequency fss, and is a second sampling cycle of which cycle is same as that of each of the first sampling cycle and the third sampling cycle. The long sampling cycle 1/fsl is a reciprocal of the sampling frequency fsl, and is a second sampling cycle of which cycle is different from that of each of the first sampling cycle and the third sampling cycle. Namely, a switching frequency of the second switch 56*b* is the sampling frequency fss and the sampling frequency fsl. Each of the sampling frequency fss and the sampling frequency fsl is less than the resonance frequency.

Note that a time interval Δt is provided between a rising point of time of the pulse of the time division signal S3*a* and a rising point of time of the pulse of the time division signal S3*b* immediately after the pulse of the time division signal S3*a* has fallen. Further, the time interval Δt is provided between the rising point of time of the pulse of the time division signal S3*b* and a rising point of time of the pulse of the time division signal S3*c* immediately after the pulse of the time division signal S3*b* has fallen; and the time interval Δt is provided between the rising point of time of the pulse of the time division signal S3*c* and the rising point of time of the pulse of the time division signal S3*a*.

The first switch 56*a* is closed under a condition that the pulse of the time division signal S3*a* is in a high level interval, and the first switch 56*a* is opened under a condition that the pulse of the time division signal S3*a* is in a low level interval. The second switch 56*b* is closed under a condition that the pulse of the time division signal S3*b* is in the high level interval, and the second switch 56*b* is opened under a condition that the pulse of the time division signal S3*b* is in the low level interval. The third switch 56*c* is closed under a condition that the pulse of the time division signal S3*c* is in the high level interval, and the third switch 56*c* is opened under a condition that the pulse of the time division signal S3*c* is in the low level interval. Namely, the first switch 56*a* performs switching between a state that the analog signal 60A amplified by the first D/A converter 52*a* is allowed to pass and a state that the analog signal 60A amplified by the first D/A converter 52*a* is not allowed to pass; the second switch 56*b* performs switching between a state that the analog signal 60B amplified by the second D/A converter 52*b* is allowed to pass and a state that the analog signal 60B amplified by the second D/A converter 52*b* is not allowed to pass; and the third switch 56*c* performs switching between a state that the analog signal 60C amplified by the third D/A converter 52*c* is allowed to pass and a state that the analog signal 60C amplified by the third D/A converter 52*c* is not allowed to pass. Note that the first switch 56*a*, the second switch 56*b*, and the third switch 56*c* are simultaneously opened in some cases, but the first switch 56*a*, the second switch 56*b*, and the third switch 56*c* are not simultaneously closed, for the following reason. That is, in a case that the first switch 56*a*, the second switch 56*b*, and the third switch 56*c* are simultaneously closed, the analog signals 60A, 60B, 60C are present in a mixed manner. Note that the analog signals 60A, 60B, 60C are not present in the mixed manner, and thus in the time division multiplex signal, a part of the analog signal 60A is continuous with a part of the analog signal 60B, a part of the analog signal 60B is continuous with a part of the analog signal 60C, and a part of the analog signal 60C is continuous with a part of the analog signal 60A. Namely, in the time division multiplex signal, the analog signal 60C and any analog signal of any other waveform are absent between the part of the analog signal 60A and the part of the analog signal 60B. Further, in the time division multiplex signal, the analog signal 60A and any analog signal of any other waveform are absent between the part of the analog signal 60B and the part of the analog signal 60C. Furthermore, in the time division multiplex signal, the analog signal 60B and any analog signal of any other waveform are absent between the part of the analog signal 60C and the part of the analog signal 60A.

A combined signal, which is obtained by combining the analog signals 60A to 60C, is outputted from the second switch control unit 56. The combined signal is same as a signal obtained by removing, from the analog signal depicted in FIG. 5, a signal in the equal voltage period EP and corresponding to a part at which the pulse of the time division signal S3*b* is not raised. The combined signal is amplified by the amplifier 53, and the amplifier 53 outputs a time division multiplex signal. The time division multiplex signal is same as a signal obtained by removing, from the time division multiplex signal depicted in FIG. 5, a signal in the equal voltage period EP and corresponding to a part at which the pulse of the time division signal S3*b* is not raised. The time division multiplex signal is inputted into the switch group 54.

The synchronization signals S2*a*, S2*b* and S2*c* correspond, respectively, to the time division signals S3*a*, S3*b* and S3*c*. Namely, the time interval between the pulses of the synchronization signal S2*b* is same as the long sampling cycle 1/fsl during the equal voltage period EP, and is same as the short sampling cycle 1/fss during the period of time which is different from the equal voltage period EP. The synchronization signals S2*a* and S2*c* are same as those in FIG. 6 of the first embodiment. The switch group 54 is driven by the synchronization signals S2*a*, S2*b* and S2*c*, the driving waveforms A, B and C are separated, and the actuator 88 is driven. Namely, the driving waveform signal Pa (first driving waveform signal) is separated from the time division multiplex signal with the first sampling frequency fsa; the driving waveform signal Pb (second driving waveform signal) is separated from the time division multiplex signal with the sampling frequency fss and the sampling frequency fsl (the second sampling frequency); and the driving waveform signal Pc (third driving waveform signal) is separated from the time division multiplex signal with the third sampling frequency fsc.

The leak current in the actuator 88 is less than a predetermined current. Namely, the voltage of the actuator 88 is likely to be maintained for a long period of time. Further, during the equal voltage period EP, the voltage of the driving waveform B is constant. Namely, in a case that the driving waveform signal Pb is separated from the time division multiplex signal in the equal voltage period EP, the number of time(s) by which the voltage is supplied to the actuator 88 may be smaller than that in a case wherein the driving waveform signals Pa or Pc is separated from the time division multiplex signal, or the driving waveform signal Pb is separated from the time division multiplex signal in the period of time different from the equal voltage period EP. Accordingly, in a case that the driving waveform signal Pb is separated from the time division multiplex signal, even if the cycle of the time division signal S3*b* is long sampling cycle 1/fsl in the equal voltage period EP, the generation of the driving waveform B1 (see FIG. 7) is not greatly affected thereby. Namely, the driving waveform B1 is inputted to the actuator 88. Note that since the length of the equal voltage period EP depends on the period of the equal voltage in the driving waveform, the entire period (period of time) may be the equal voltage period EP.

Figure 12:
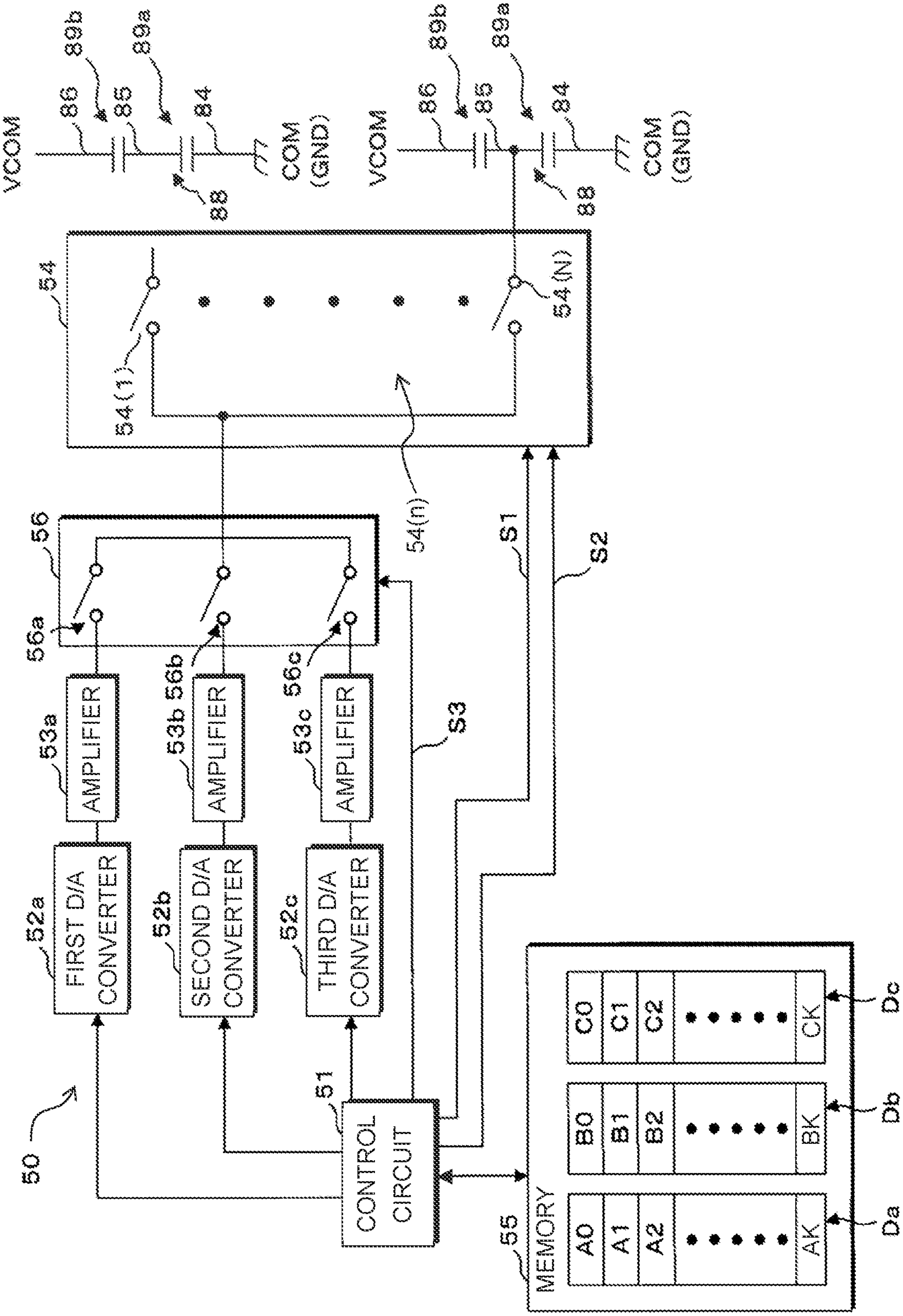
FIG. 12 is a block diagram of a controller.

The printing apparatus 1 according to the fourth embodiment may be modified to have the following configuration. FIG. 12 is a block diagram of a controller 50 according to a modification. In the modification, three amplifiers 53*a* to 53*c* are provided, instead of the amplifier 53. Further, the analog signal of the first D/A converter 52*a* is inputted into the amplifier 53*a*, and the amplifier 53*a* outputs the analog signal to the first switch 56*a*. The analog signal of the second D/A converter 52*b* is inputted into the amplifier 53*b*, and the amplifier 53*b* outputs the analog signal to the second switch 56*b*. The analog signal of the third D/A converter 52*c* is inputted into the amplifier 53*c*, and the amplifier 53*c* outputs the analog signal to the third switch 56*c*.

The first to third switches 56*a* to 56*c* are opened and closed, respectively, on the basis of the first to third time division signals S3*a* to S3*c*, and the time division multiplex signal is generated. In other words, in the time division multiplex signal, a part of the analog signal 60A outputted from the amplifier 53*a* is continuous with a part of the analog signal 60B outputted from the amplifier 53*b*, a part of the analog signal 60B outputted from the amplifier 53*b* is continuous with a part of the analog signal 60C outputted from the amplifier 53*c*, and a part of the analog signal 60C outputted from the amplifier 53*c* is continuous with a part of the analog signal 60A outputted from the amplifier 53*a*.

That is, in the time division multiplex signal, the part of the analog signal 60C outputted from the amplifier 53*c* and any analog signal of any other waveform are absent between the part of the analog signal 60A outputted from the amplifier 53*a* and the part of the analog signal 60B outputted from the amplifier 53*b*. Further, in the time division multiplex signal, the part of the analog signal 60A outputted from the amplifier 53*a* and any analog signal of any other waveform are absent between the part of the analog signal 60B outputted from the amplifier 53*b* and the part of the analog signal 60C outputted from the amplifier 53*c*. Further, in the time division multiplex signal, the part of the analog signal 60B outputted from the amplifier 53*b* and any analog signal of any other waveform are absent between the part of the analog signal 60C outputted from the amplifier 53*c* and the part of the analog signal 60A outputted from the amplifier 53*a*. The bands of the respective amplifiers can be narrowed by using the three amplifiers, which in turn makes it easy to realize the time division multiplexing.

Figure 13:
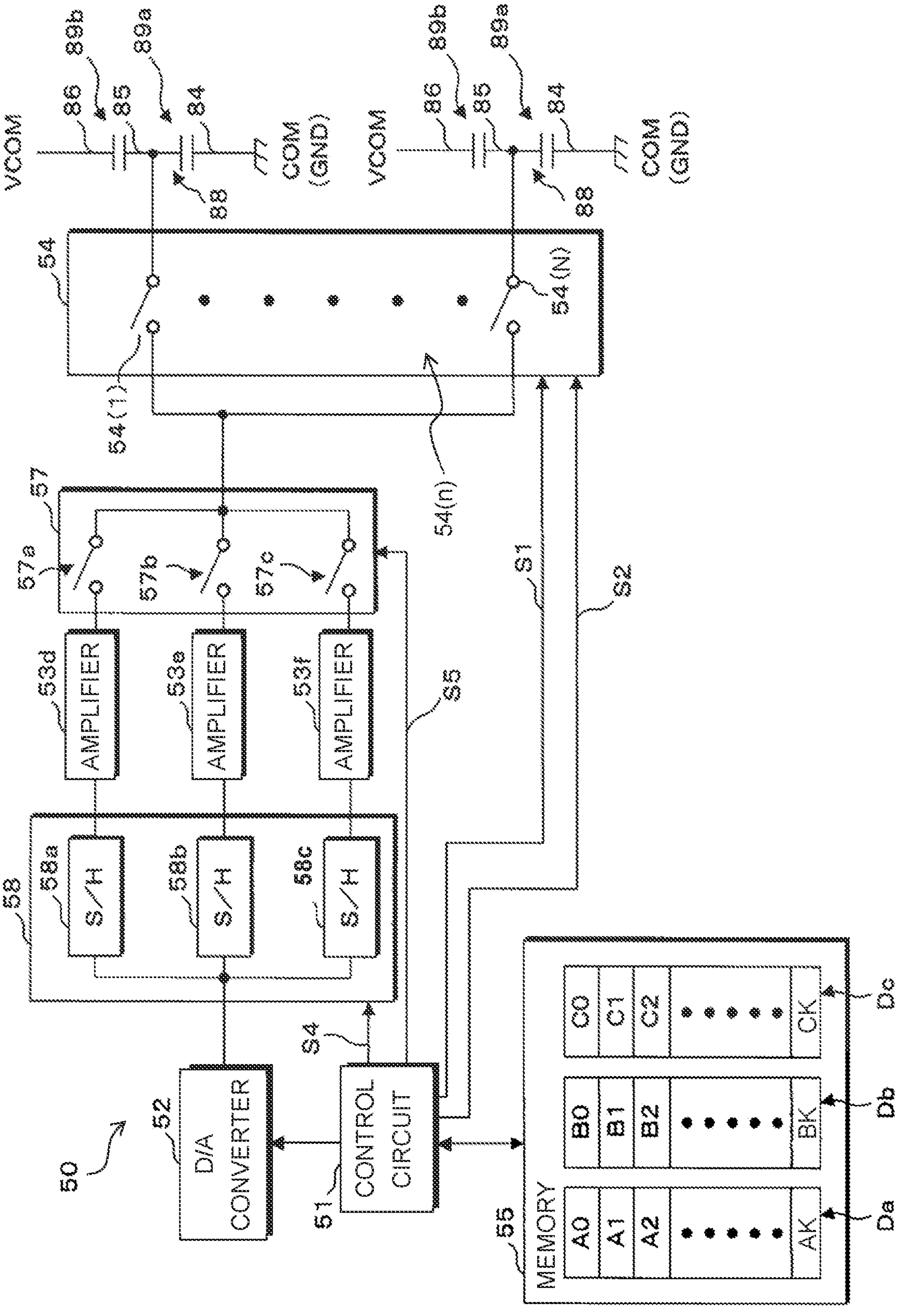
FIG. 13 is a block diagram of a controller.

The present disclosure will be explained below on the basis of the drawings which depict a printing apparatus 1 according to a fifth embodiment. Constitutive components according to the fifth embodiment, which are the same as or equivalent to the constitutive components according to the first to fourth embodiments, are designated by the same reference numerals as those of the first to fourth embodiments, any detailed explanation of which will be omitted. FIG. 13 is a block diagram of a controller 50.

The controller 50 is provided with, for example, a control circuit 51, a D/A converter 52, three amplifiers 53*d* to 53*f*, a switch group 54, a memory 55, a third switch control unit 57, and a sample hold unit 58 (S/H unit). The third switch control unit 57 is provided with a first switch 57*a*, a second switch 57*b*, and a third switch 57*c*. The sample hold unit 58 is provided with a first sample hold circuit 58*a* (first S/H circuit), a second sample hold circuit 58*b* (second S/H circuit), and a third sample hold circuit 58*c* (third S/H circuit).

The control circuit 51 outputs time series data to the D/A converter 52. The D/A converter 52 converts the time series data into an analog signal, and outputs the analog signal to the sample hold unit 58. The analog signal, which is outputted by the D/A converter 52, is the same as or equivalent to the analog signal depicted in FIG. 5.

The control circuit 51 outputs, to the sample hold unit 58, sampling signals S4*a* to S4*c* each of which indicates a sampling cycle. The sampling signal S4*a* is inputted into the first sample hold circuit 58*a*, the sampling signal S4*b* is inputted into the second sample hold circuit 58*b*, and the sampling signal S4*c* is inputted into the third sample hold circuit 58*c*. The sampling cycles of the sampling signals S4*a* to S4*c* are different from one another, and are deviated from one another by a time interval Δt. Note that the three sampling signals S4*a*, S4*b*, S4*c* are simply referred to as “sampling signal S4” as well (see FIG. 13).

The first sample hold circuit 58*a* samples and holds the analog signal at the sampling cycle of the sampling signal S4*a*, and outputs the analog signal to the amplifier 53*d*. The second sample hold circuit 58*b* samples and holds the analog signal at the sampling cycle of the sampling signal S4*b*, and outputs the analog signal to the amplifier 53*e*. The third sample hold circuit 58*c* samples and holds the analog signal at the sampling cycle of the sampling signal S4*c*, and outputs the analog signal to the amplifier 53*f*.

The analog signal, which is outputted by the first sample hold circuit 58*a*, is the same as or equivalent to the analog signal 60A depicted in FIG. 11. The analog signal, which is outputted by the second sample hold circuit 58*b*, is the same as or equivalent to the analog signal 60B depicted in FIG. 11. The analog signal, which is outputted by the third sample hold circuit 58*c*, is the same as or equivalent to the analog signal 60C depicted in FIG. 11.

The amplifier 53*d* amplifies the analog signal and outputs the analog signal to the first switch 57*a*. The amplifier 53*e* amplifies the analog signal and outputs the analog signal to the second switch 57*b*. The amplifier 53*f* amplifies the analog signal and outputs the analog signal to the third switch 57*c*.

The control circuit 51 outputs, to the third switch control unit 57, a time division signal S5*a* which corresponds to the analog signal outputted by the amplifier 53*d*, a time division signal S5*b* which corresponds to the analog signal outputted by the amplifier 53*e*, and a time division signal S5*c* which corresponds to the analog signal outputted by the amplifier 53*f*. Note that the three time division signals S5*a*, S5*b*, S5*c* are simply referred to as “time division signal S5” as well (see FIG. 13).

The time division signals S5*a*, S5*b*, S5*c* are the pulse waves which are the same as or equivalent to the time division signals S3*a*, S3*b*, S3*c* depicted in FIG. 11. The time interval Δt is provided between the rising point of time of the pulse of the time division signal Sa and the rising point of time of the pulse of the time division signal S5*b* immediately after the pulse of the time division signal S5*a* has fallen. Further, the time interval Δt is provided between the rising point of time of the pulse of the time division signal S5*b* and the rising point of time of the pulse of the time division signal S5*c* immediately after the pulse of the time division signal S5*b* has fallen, and the time interval Δt is provided between the rising point of time of the pulse of the time division signal S5*c* and the rising point of time of the pulse of the time division signal S5*a*.

The first switch 57*a* is closed under a condition that the pulse of the time division signal S5*a* is in a high level interval, and the first switch 57*a* is opened under a condition that the pulse of the time division signal S5*a* is in a low level interval. The second switch 57*b* is closed under a condition that the pulse of the time division signal S5*b* is in the high level interval, and the second switch 57*b* is opened under a condition that the pulse of the time division signal S5*b* is in the low level interval. The third switch 57*c* is closed under a condition that the pulse of the time division signal S5*c* is in the high level interval, and the third switch 57*c* is opened under a condition that the pulse of the time division signal S5*c* is in the low level interval. Note that the first switch 57*a*, the second switch 57*b*, and the third switch 57*c* are simultaneously opened in some cases, but the first switch 57*a*, the second switch 57*b*, and the third switch 57*c* are not simultaneously closed, for the following reason. That is, under a condition that the first switch 57*a*, the second switch 57*b*, and the third switch 57*c* are simultaneously closed, the analog signals 60A, 60B, 60C are present in a mixed manner.

Note that the analog signals 60A, 60B, 60C are not present in the mixed manner and thus in the time division multiplex signal, a part of the analog signal 60A outputted from the amplifier 53*d* is continuous with a part of the analog signal 60B outputted from the amplifier 53*e*, a part of the analog signal 60B outputted from the amplifier 53*e* is continuous with a part of the analog signal 60C outputted from the amplifier 53*f*, and a part of the analog signal 60C outputted from the amplifier 53*f* is continuous with a part of the analog signal 60A outputted from the amplifier 53*d*. In other words, in the time division multiplex signal, the part of the analog signal 60C outputted from the amplifier 53*f* and any analog signal of any other waveform are absent between the part of the analog signal 60A outputted from the amplifier 53*d* and the part of the analog signal 60B outputted from the amplifier 53*e*.

Further, in the time division multiplex signal, the part of the analog signal 60A outputted from the amplifier 53*d* and any analog signal of any other waveform are absent between the part of the analog signal 60B outputted from the amplifier 53*e* and the part of the analog signal 60C outputted from the amplifier 53*f*. Further, in the time division multiplex signal, the part of the analog signal 60B outputted from the amplifier 53*e* and any analog signal of any other waveform are absent between the part of the analog signal 60C outputted from the amplifier 53*f* and the part of the analog signal 60A outputted from the amplifier 53*d*.

A combined signal, i.e., a time division multiplex signal, obtained by combining the analog signals which are outputted, from the amplifiers 53*d* to 53*f* and which are the analog signal passed the first switch 57*a*, the analogue signal passed the second switch 57*b* and the analog signal passed the third switch 57*c*, is outputted from the third switch control unit 57. The time division multiplex signal is same as a signal obtained by removing from the time division multiplex signal depicted in FIG. 5, a signal in the equal voltage period EP and corresponding to a part at which the pulse of the time division signal S5*b* is not raised. The time division multiplex signal is inputted into the switch group 54.

The synchronization signals S2*a*, S2*b* and S2*c* correspond, respectively, to the time division signals S5*a*, S5*b* and S5*c*. Namely, the time interval between the pulses of the synchronization signal S2*b* is same as the long sampling cycle 1/fsl during the equal voltage period EP, and is same as the short sampling cycle 1/fss during the period of time which is different from the equal voltage period EP. The synchronization signals S2*a* and S2*c* are same as those in FIG. 6 of the first embodiment. The switch group 54 is driven by the synchronization signals S2*a*, S2*b* and S2*c*, the driving waveforms A, B and C are separated, and the actuator 88 is driven. Namely, the driving waveform signal Pa (first driving waveform signal) is separated from the time division multiplex signal with the first sampling frequency fsa; the driving waveform signal Pb (second driving waveform signal) is separated from the time division multiplex signal with the sampling frequency fss and the sampling frequency fsl (second sampling frequency); and the driving waveform signal Pc (third driving waveform signal) is separated from the time division multiplex signal with the third sampling frequency fsc.

Note that the sampling point of time, which is indicated by the sampling signal S4*a*, is earlier than the closing point of time which is indicated by the time division signal Sa, the sampling point of time, which is indicated by the sampling signal S4*b*, is earlier than the closing point of time which is indicated by the time division signal S5*b*, and the sampling point of time, which is indicated by the sampling signal S4*c*, is earlier than the closing point of time which is indicated by the time division signal S5*c*.

In the printing apparatus 1 according to the fifth embodiment, the data values of the driving waveform data Da, Db, Dc are read from the memory 55, and the data are inputted into the D/A converter 52 while being aligned in time series. The first sample hold circuit 58*a* is operated on the basis of the first sampling signal S4*a*, the second sample hold circuit 58*b* is operated on the basis of the second sampling signal S4*b*, and the third sample hold circuit 58*c* is operated on the basis of the third sampling signal S4*c*. The first to third switches 57*a* to 57*c* can be opened and closed on the basis of the time division signals S5*a* to S5*c* to generate the time division multiplex signal.

Further, the sampling point of time, which is indicated by the sampling signal S4*a*, is earlier than the closing point of time which is indicated by the time division signal S5*a*, the sampling point of time, which is indicated by the sampling signal S4*b*, is earlier than the closing point of time which is indicated by the time division signal S5*b*, and the sampling point of time, which is indicated by the sampling signal S4*c*, is earlier than the closing point of time which is indicated by the time division signal S5*c*. Therefore, the influence exerted on the generation of the time division multiplex signal can be suppressed, which would be otherwise caused by the delay of the time division signal S5*a* to S5*c*.

Figure 14:
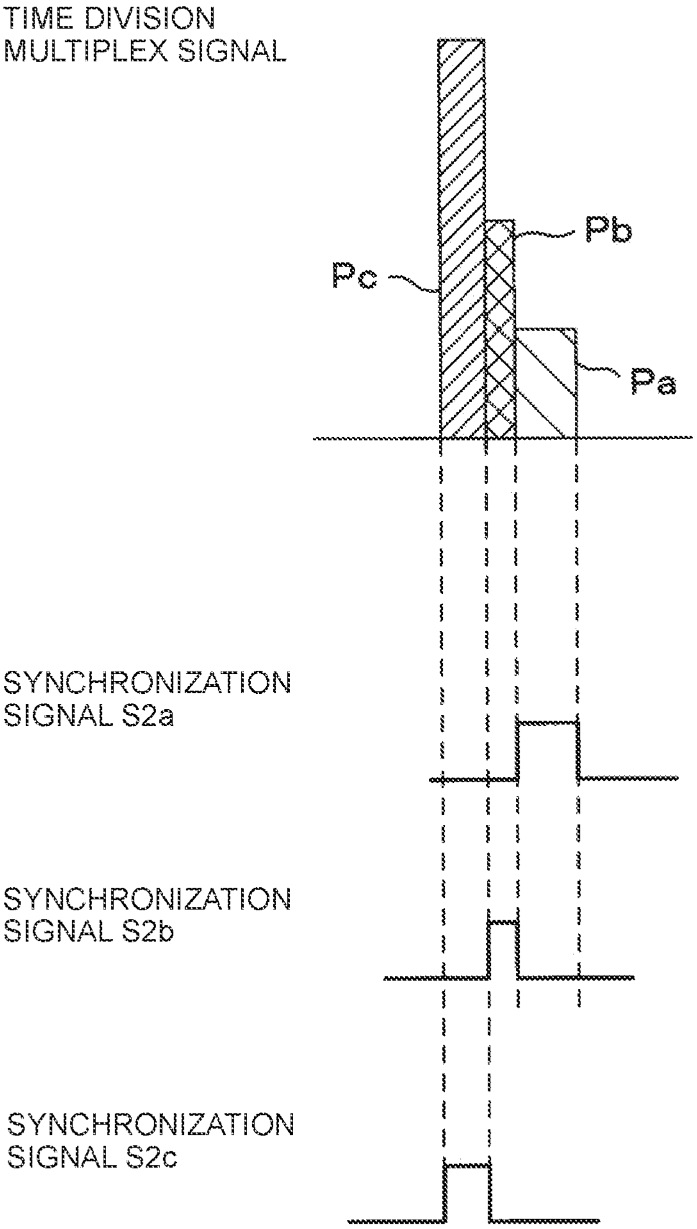
FIG. 14 is a graph indicating a time division multiplex signal and synchronization signals.

The present disclosure will be explained below on the basis of the drawing which depicts a printing apparatus 1 according to a sixth embodiment. Constitutive components according to the sixth embodiment, which are the same as or equivalent to the constitutive components according to the first to fifth embodiments, are designated by the same reference numerals as those of the first to fifth embodiments, any detailed explanation of which will be omitted. FIG. 14 is a graph depicting a time division multiplex signal and synchronization signals S2*a* to S2*c*. The total of widths of three continuous driving waveform signals Pa, Pb and Pc is preferable to be within a time (period of time) which is determined by a reference clock. In other words, under a condition that the above-described total is within the above-described period of time, it is possible to change the width of each of the driving waveform signals Pa, Pb and Pc.

In the sixth embodiment, the widths of the driving waveform signals Pa, Pb and Pc are mutually different. The width of the synchronization signal S2*a* corresponds to the driving waveform signal Pa, the width of the synchronization signal S2*b* corresponds to the driving waveform signal Pb and the width of the synchronization signal S2*c* corresponds to the driving waveform signal Pc. Namely, the widths of the synchronization signals S2*a*, S2*b* and S2*c* are mutually different. The total of the widths of the synchronization signals S2*a*, S2*b* and S2*c* are substantially same as the total of the widths of the driving signals Pa, Pb and Pc. Note that the width of the first pulse signal corresponds to the width of each of the first part corresponding to the data Ak−1 and the width of the second part corresponding to the data Ak. Further, the width of the second pulse signal corresponds to each of the width of the third part corresponding to the data Bk−1 and the width of the fourth part corresponding to the data Bk.

In the sixth embodiment, in a case that a driving waveform in which the voltage changes abruptly in a short period of time is separated from the time division multiplex signal, the width (cycle or time) of the driving waveform signal is made long, and the width of the synchronization signal is also made long. Accordingly, the period of time during which the voltage is applied to the actuator 88 becomes long, thereby making it possible to change the voltage of the actuator 88, up to a target voltage corresponding to the driving waveform, in an ensured manner. On the other hand, in a case that a driving waveform in which the voltage does not change greatly is separated from the time division multiplex signal, the width of the driving waveform signal is made short, and the width of the synchronization signal is also made short. Namely, it is possible to change the widths of the synchronization signals S2*a*, S2*b* and S2*c* in accordance with the widths of the driving waveform signals Pa, Pb and Pc, respectively.

Note that the computer program is capable of being arranged on a single computer, or being arranged on one site, or being extended such that the computer program is executed on a plurality of computers dispersed over a plurality of sites and interconnected by a communication network.

The embodiments disclosed herein are examples in all senses, and should be interpreted not restrictive or limiting in any way. The scope of the present disclosure is intended to encompass all the changes within the scope of the claims and a scope equivalent to the scope of the claims. The technical features described in the respective embodiments can be combined with each other. Further, the independent claims and the dependent claims described in the claims can be combined with each other in all and any combinations, irrespective of the form of reference therebetween.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A head comprising:

a nozzle plate having a nozzle configured to discharge a liquid by an energy generating element;

a signal generator configured to generate, based on at least first data representing a first driving waveform and second data representing a second driving waveform different from the first driving waveform, a time division multiplex signal including a first portion being a part of the first driving waveform, a second portion being other part of the first driving waveform, a third portion being a part of the second driving waveform and a fourth portion being other part of the second driving waveform; and a separator configured to separate a first driving waveform signal representing the first driving waveform or a second driving waveform signal representing the second driving waveform from the time division multiplex signal generated by the signal generator, by performing a sampling of the time division multiplex signal, wherein:

in the time division multiplex signal, the third portion being the part of the second driving waveform is aligned between the first portion being the part of the first driving waveform and the second portion being other part of the first driving waveform, and the second portion being other part of the first driving waveform is aligned between the third portion being the part of the second driving waveform and the fourth portion being other part of the second driving waveform;

the time division multiplex signal is configured to transmit the first data and the second data via a single signal line;

the separator is configured to perform the sampling of the time division multiplex signal with a sampling frequency less than a resonance frequency at the nozzle; and the energy generating element is configured to be driven by the first driving waveform signal or the second driving waveform signal separated by the separator.

2. The head according to claim 1, further comprising a channel member including a pressure chamber configured to apply a pressure for discharging the liquid from the nozzle by driving of the energy generating element, wherein the resonance frequency is a resonance frequency in a case that the liquid is filled in the pressure chamber.

3. The head according to claim 1, wherein:

each of the first driving waveform and the second driving waveform includes a rising part and a falling part;

the separator is configured to perform the sampling, with respect to the rising part, with the sampling frequency less than the resonance frequency, at least at a first point of time, at a second point of time after the first point of time, and at a third point of time after the second point of time; and the separator is configured to perform the sampling, with respect to the falling part, with the sampling frequency less than the resonance frequency, at least at a fourth point of time, at a fifth point of time after the fourth point of time, and at a sixth point of time after the fifth point of time.

4. The head according to claim 3, wherein a value of the sampling frequency, less than the resonance frequency, to be applied to the rising part and the falling part of the first driving waveform is same as a value of the sampling frequency, less than the resonance frequency, applied to the rising part and the falling part of the second driving waveform.

5. The head according to claim 3, wherein:

each of the first driving waveform and the second driving waveform includes an intermediate part to be applied to the energy generating element so that a voltage becomes constant, the intermediate part being aligned between the rising part and the falling part; and the separator is configured to perform the sampling, with respect to the intermediate part, with the sampling frequency less than the resonance frequency, at least at a seventh point of time, at an eighth point of time after the seventh point of time, and at a ninth point of time after the eighth point of time.

6. The head according to claim 5, wherein a value of the sampling frequency, less than the resonance frequency, to be applied to the intermediate part of the first driving waveform is same as a value of the sampling frequency, less than the resonance frequency, to be applied to the intermediate part of the second driving waveform.

7. The head according to claim 5, wherein:

a leak current in the energy generating element is not less than a predetermined current;

in a case that a sampling cycle elapses, a deforming amount of the energy generating element is changed by the leak current, the sampling cycle being a reciprocal of the sampling frequency less than the resonance frequency; and a volume of the liquid discharged from the nozzle is changed by the changing of the deforming amount of the energy generating element by the leak current.

8. The head according to claim 3, wherein:

a leak current in the energy generating element is less than a predetermined current;

in a case that a sampling cycle elapses, a deforming amount of the energy generating element is changed by the leak current, and a volume of the liquid discharged from the nozzle is not changed despite the changing of the deforming amount of the energy generating element by the leak current, the sampling cycle being a reciprocal of the sampling frequency less than the resonance frequency;

each of the first driving waveform and the second driving waveform includes an intermediate part to be applied to the energy generating element so that a voltage becomes constant, the intermediate part being aligned between the rising part and the falling part; and a number of a sampling point of time of the sampling, with respect to the intermediate part, performed by the separator with the sampling frequency less than the resonance frequency is not more than two.

9. The head according to claim 3, wherein:

the sampling frequency, less than the resonance frequency, to be applied to at least a part of the first driving waveform is a first sampling frequency;

a first sampling cycle is a reciprocal of the first sampling frequency;

the sampling frequency, less than the resonance frequency, to be applied to at least a part of the second driving waveform is a second sampling frequency;

a second sampling cycle is a reciprocal of the second sampling frequency; and the first sampling cycle and the second sampling cycle are different from each other.

10. The head according to claim 9, wherein the signal generator includes:

a control circuit, a first digital-analog converter, a second digital-analog converter, a first switch configured to switch between a state that a signal converted by the first digital-analog converter passes through the first switch and a state that the signal converted by the first digital-analog converter does not pass through the first switch; and a second switch configured to switch between a state that a signal converted by the second digital-analog converter passes through the second switch and a state that the signal converted by the second digital-analog converter does not pass through the second switch, wherein:

a switching frequency of the first switch is same as the first sampling frequency;

a switching frequency of the second switch is same as the second sampling frequency; and the separator is configured to separate the first driving waveform signal from the time division multiplex signal with the first sampling frequency and to separate the second driving waveform signal from the time division multiplex signal with the second sampling frequency.

11. The head according to claim 9, wherein the signal generator includes:

a control circuit;

a digital-analog converter;

a first sample hold circuit and a second sample hold circuit each configured to sample and hold an analog signal of the digital-analog converter;

a first switch configured to switch between a state that a signal held by the first sample hold circuit passes through the first switch and a state that the signal held by the first sample hold circuit does not pass through the first switch; and a second switch configured to switch between a state that a signal held by the second sample hold circuit passes through the second switch and a state that the signal held by the second sample hold circuit does not pass through the second switch, wherein:

a switching frequency of the first switch is same as the first sampling frequency;

a switching frequency of the second switch is same as the second sampling frequency;

the time division multiplex signal includes an output signal from the first switch and an output signal from the second switch; and the separator is configured to separate the first driving waveform signal from the time division multiplex signal with the first sampling frequency and to separate the second driving waveform signal from the time division multiplex signal with the second sampling frequency.

12. The head according to claim 3, wherein:

the separator is configured to separate the first part and the second part from the time division multiplex signal by a first pulse signal, and to separate the third part and the fourth part from the time division multiplex signal by a second pulse signal;

a width of the first pulse signal is different from a width of the second pulse signal;

the width of the first pulse signal corresponds to a width of each of the first part and the second part; and the width of the second pulse signal corresponds to a width of each of the third part and the fourth part.

13. A method of driving a head, the head including a nozzle plate having a nozzle configured to discharge a liquid by an energy generating element, the method comprising:

generating, based on at least first data representing a first driving waveform and second data representing a second driving waveform different from the first driving waveform, a time division multiplex signal including a first portion being a part of the first driving waveform, a second portion being other part of the first driving waveform, a third portion being a part of the second driving waveform and a fourth portion being other part of the second driving waveform; and separating a first driving waveform signal representing the first driving waveform or a second driving waveform signal representing the second driving waveform from the time division multiplex signal, wherein:

in the time division multiplex signal, the third portion being the part of the second driving waveform is aligned between the first portion being the part of the first driving waveform and the second portion being other part of the first driving waveform, and the second portion being other part of the first driving waveform is aligned between the third portion being the part of the second driving waveform and the fourth portion being other part of the second driving waveform;

the time division multiplex signal is configured to transmit the first data and the second data via a single signal line; and the separating of the first driving waveform signal or the second driving waveform signal is performed with a sampling frequency less than a resonance frequency at the nozzle, the method further comprising driving the energy generating element by the first driving waveform signal or the second driving waveform signal.

14. A non-transitory computer-readable medium storing a program that is executable by a controller configured to control a head, the head including a nozzle plate having a nozzle configured to discharge a liquid by an energy generating element;

the program is configured to cause the controller to execute processes of:

generating, based on at least first data representing a first driving waveform and second data representing a second driving waveform different from the first driving waveform, a time division multiplex signal including a first portion being a part of the first driving waveform, a second portion being other part of the first driving waveform, a third portion being a part of the second driving waveform and a fourth portion being other part of the second driving waveform; and separating a first driving waveform signal representing the first driving waveform or a second driving waveform signal representing the second driving waveform from the time division multiplex signal, wherein:

in the time division multiplex signal, the third portion being the part of the second driving waveform is aligned between the first portion being the part of the first driving waveform and the second portion being other part of the first driving waveform, and the second portion being other part of the first driving waveform is aligned between the third portion being the part of the second driving waveform and the fourth portion being other part of the second driving waveform;

the time division multiplex signal is configured to transmit the first data and the second data via a single signal line; and the separating of the first driving waveform signal or the second driving waveform signal is performed with a sampling frequency less than a resonance frequency at the nozzle, the program is further configured to cause the controller to execute a process of driving the energy generating element by the first driving waveform signal or the second driving waveform signal.

* * * * *